United States Patent [19]
Uemura et al.

[11] Patent Number: 6,145,754
[45] Date of Patent: *Nov. 14, 2000

[54] AIR CONDITIONER FOR VEHICLE

[75] Inventors: Yukio Uemura; Kazushi Shikata, both of Kariya; Hiroshi Nonoyama, Toyota; Hikaru Sugi, Nagoya; Kenji Suwa, Kariya; Tadashi Suzuki, Toyota, all of Japan

[73] Assignee: Denso Corporation, Kariya, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/763,362

[22] Filed: Dec. 11, 1996

[30] Foreign Application Priority Data

| Dec. 15, 1995 | [JP] | Japan | 7-327606 |
| Mar. 19, 1996 | [JP] | Japan | 8-063415 |
| Jul. 24, 1996 | [JP] | Japan | 8-194996 |
| Oct. 30, 1996 | [JP] | Japan | 8-288801 |

[51] Int. Cl.[7] .............................. F25B 29/00; B60H 1/00
[52] U.S. Cl. .................. 237/12.3 A; 165/203; 165/204; 165/42; 165/43; 165/231; 237/12.313; 237/2 A; 454/121; 454/126; 454/154; 236/91 C
[58] Field of Search .............................. 165/42, 43, 203, 165/204, 231; 237/12.3 A, 2 A, 12.3 B; 454/121, 126, 154; 236/91 C; 62/244

[56] References Cited

U.S. PATENT DOCUMENTS

| 3,948,312 | 4/1976 | Nisbet | 165/42 |
| 4,681,153 | 7/1987 | Uchida | 165/43 |
| 4,685,508 | 8/1987 | Iida | 165/43 |
| 4,730,662 | 3/1988 | Kobayashi | 165/43 |
| 5,309,731 | 5/1994 | Nonoyama et al. | 62/244 |
| 5,390,728 | 2/1995 | Ban | 165/43 |
| 5,699,960 | 12/1997 | Kato et al. | 237/12.3 A |
| 5,857,905 | 1/1999 | Uemura et al. | 165/43 |

FOREIGN PATENT DOCUMENTS

| 60-8105 | 1/1985 | Japan . | |
| 61-263822 | 11/1986 | Japan | 237/12.3 A |
| 62-29411 | 2/1987 | Japan | 237/12.3 A |
| 5-124426 | 5/1993 | Japan . | |
| 6-255340 | 9/1994 | Japan | 237/2 B |

*Primary Examiner*—John K. Ford
*Attorney, Agent, or Firm*—Harness, Dickey & Pierce, PLC

[57] ABSTRACT

According to the present invention, even when the two-layer mode in which the inside air is introduced into a first air passage and the outside air is introduced into a second air passage is set, it is further determined whether air mix doors are controlled at the maximum hot positions. When it has been determined that the air mix doors are controlled at the maximum hot positions, the inside/outside air introduction mode is still set to the two-layer mode, because the temperature difference due to the outside air temperature is small, however, otherwise, the inside/outside air introduction mode is not set to the two-layer mode but is set to a mode in which the outside air is introduced into the both air passages. In this way, it is possible to prevent the difference between the temperatures of the air blown out from a defroster opening portion and a foot opening portion from being increased due to the temperature of the outside air.

6 Claims, 13 Drawing Sheets

AIR CONDITIONER FOR VEHICLE

CROSS REFERENCE TO THE RELATED APPLICATIONS

This application is based on and claims priority of Japanese Patent Applications of No.7-327606 filed on Dec. 15, 1995, No.8-63415 filed on Mar. 19, 1996, No.8-194996 filed on Jul. 24, 1996, and No.8-288801 filed on Oct. 30, 1996.

BACKGROUND OF THE INVENTION

1. Field of the Invention

The present invention relates to an air conditioner for a vehicle, which includes an air conditioning case having therein a first air passage and a second air passage and introduces the inside air and the outside air into the first air passage and the second air passage, respectively.

2. Description of Related Arts

Conventionally, an air conditioner for a vehicle, of this type, has been disclosed in JP-A-5-124426. In an air conditioning case of this air conditioner for a vehicle, there are formed an inside air inlet and an outside air inlet on one end side and formed on the other end side a foot air outlet, a defroster air outlet and a face air outlet.

In the air conditioning case, there is provided a partitioning plate which partitions an interior thereof into a first air passage extending from the inside air inlet to the face air outlet and the foot air outlet and a second air passage extending from the outside air inlet to the defroster air outlet.

Further, in the both air passages, there are provided a heating heat exchanger, a bypass passage bypassing the heating heat exchanger, and air mix doors. The air mix doors are constructed such that the door on the first air passage side and the door on the second air passage side are integrally provided on a single rotary shaft rotatably provided over the both air passages.

When any one of a face mode, a bi-level mode and a foot mode is selected as the air outlet mode, if the inside/outside air mode at this time is an inside air circulation mode, the inside air is introduced into the both air passages. On the other hand, if the inside/outside air mode at that time is an outside air introduction mode, the outside air is introduced into the both air passages. Also, when a defroster mode is selected as the air outlet mode, the outside air is introduced into the both air passages.

When a foot/def mode is selected as the air outlet mode, the inside/outside air mode is set to a two-layer mode in which the inside air is introduced into the first air passage and the outside air is introduced into the second air passage. By using this two-layer mode, since the interior of the passenger compartment is heated by the inside air having been already heated, the heating performance is enhanced. Further, since the outside air having low humidity is blown out into the windshield, the frost prevention performance of the windshield is enhanced.

In contrast to the above air conditioner for a vehicle, there has been disclosed an apparatus wherein the air mix door on the first air passage side and the air mix door on the second air passage side are independently rotated in JP-A-62-29411.

However, as a result of the present inventors' studies and examinations, it turns out that, in the apparatuses disclosed in JP-A-5-124426 and JP-A-62-29411, when the two-layer mode in which the inside air is introduced into the first air passage and the outside air is introduced into the second air passage is set, since the temperature difference (hereinafter referred to as "upper/lower temperature difference") between the temperature of the air blown out into the feet of the passenger and the temperature of the air blown out into the windshield varies due to the temperature of the outside air, the passenger may feel uncomfortable depending on the temperature of the outside air introduced at that time. The reason will now be described.

First, in the apparatus disclosed in JP-A-5-124426, as mentioned above, the air mix door on the first air passage side and the air mix door on the second air passage side are both rotated integrally with each other. Accordingly, when the interior of the passenger compartment is set to a predetermined set temperature, the air mix doors on both the first and second air passage sides have the same predetermined opening degrees.

Here, since the inside air is introduced into the first air passage, the temperature of the air blown out from the foot air outlet to the feet of the passenger through this first air passage has no relationship with the temperature of the outside air. However, since the outside air is introduced into the second air passage, the temperature of the air blown out from the defroster air outlet to the windshield through this second air passage varies in correspondence with the temperature of the outside air.

Accordingly, in the case the air mix doors are rotated to the predetermined opening degrees, even if the upper/lower temperature difference when the temperature of the outside air is a predetermined value is comfortable for the passenger, the temperature of the air blown out to the windshield becomes higher when the temperature of the outside air is higher than the predetermined value, despite the temperature of the air that blown out to the feet of the passenger does not vary, the upper/lower temperature difference becomes smaller and as a result the face portion of the passenger may be flushed.

When the opening degrees of the air mix doors is so adjusted as to decrease the air temperature to prevent the face portion from being flushed, since both of the air mix doors for the air passages are moved together, the temperature of the air blown out to the feet of the passenger may be inconveniently lowered, and as a result a cool feeling due to the cool air is given to the feet of the passenger.

Also, when the upper/lower temperature difference is tuned so as to be an appropriate value in a mode where the inside or outside air is introduced into each of the first and second air passages, this temperature difference, since the temperature of the air blown out to the windshield is lowered in accordance with a decrease in the temperature of the outside air introduced into the second air passage when the inside/outside air mode is set to the two-layer mode, the upper/lower temperature difference becomes larger, and the passenger may feel uncomfortable.

Also, in the apparatus in JP-A-62-29441, since the passenger manually adjusts the temperatures of the conditioned airs in the first and second air passages, there is no description of the method against the variation in the upper/lower temperature difference due to the change in the temperature of the outside air in an automatic air conditioner in which the temperature of the conditioned air is automatically controlled. As a result of studies and examinations by the inventors, it turns out that, when the opening degree of the air mix door provided in the second air passage is set to a certain value, the temperature of the outside air decreases, and the upper/lower temperature difference becomes larger.

SUMMARY OF THE INVENTION

In view of the above, the present invention has an object to reduce the upper/lower temperature difference due to a change in the temperature of the outside air.

The inventors have experimented on the air conditioner including:

an air conditioning case having a first inside air suction port an outside air suction port formed on one end side and a foot opening portion for blowing out an air toward foot of a passenger within the passenger compartment, a defroster opening portion for blowing out the air toward an inner surface of a windshield of the vehicle, formed on the other end side thereof;

a partitioning member for partitioning an interior of the air conditioning case into a first air passage extending from the first inside air suction port to the foot opening portion and a second air passage extending from the outside air suction port to the defroster opening portion;

an air blower for generating air flow in the first and second air passages in a direction from the one end side to the other end side of the air conditioning case;

a heating heat exchanger provided in the first and the second air passages, for heating the air in the first and second air passages;

bypass passage formed in the first and second air passages, for bypassing the heating heat exchanger;

air amount ratio adjusting means disposed in the first and second air passages, for adjusting an air amount ratio between the air passing through the heating heat exchanger and the air passing through the bypass passage; wherein, the air amount ratio adjusting means adjusts both of the air amount ratio in the first air passage and the air amount ratio in the second air passage in the same manner.

In the experimentation, the difference between the temperatures of the air from the respective opening portions in accordance with the variation in the temperature of the outside air when the inside/outside air mode has been set to the two-layer mode in which the inside air is introduced into the first air passage and the outside air is introduced into the second air passage is measured (1) in a case where the air amount ratio adjusting means is in a state in which all the air from the air blower passes through the heating heat exchanger, and (2) in a case where the air amount ratio adjusting means is in a state in which ¾ of the air from the air blower passes through the heating heat exchanger and the remaining ¼ of the air passes through the bypass passage. The temperature of the inside air at the time of the measurement is 25° C.

As a result, as illustrated in FIG. 17, in the above mentioned both cases (1) and (2), the upper/lower temperature difference ((the temperature of the air blown out from the foot opening portion)—(the temperature of the blowout air from the defroster opening portion)) becomes larger as the temperature of the outside air becomes lower. The reason for this is because the temperature of the air blown out from the foot opening portion does not vary and the temperature of the air blown out from the defroster opening portion becomes lower as the temperature of the outside air becomes lower.

The degree of the variation in the upper/lower temperature difference in accordance with the variation in the temperature of the outside air is much larger in the case (2) than in the case (1). Specifically, when the temperature of the outside air is −20° C. as compared with when the temperature is 0° C., the upper/lower temperature difference becomes larger by 4° C. in the case (1), and in contrast to this, becomes larger by even 8° C. in the case (2).

This is because the amount of the air passing through the bypass passage, i.e., the amount of the air flowing directly toward the defroster opening portion without being heated by the heating heat exchanger, is larger in the case (2) than in the case (1). Accordingly, the temperature of the air blown out from the defroster opening portion becomes lower in the case (2) than in the case (1) as the temperature of the outside air becomes lower, and as a result the upper/lower temperature difference becomes larger in the case (2).

In view of the above fact, according to an aspect of the present invention, the air conditioner includes maximum heating state detecting means for detecting that both of the first heating amount adjusting means and the second heating amount adjusting means are in the maximum heating states where each heating amount is substantially maximized. When the maximum heating state detecting means has detected the maximum heating states, the inside air from the first inside air suction port is introduced into the first air passage, and the outside air from the outside air suction port is introduced into the second air passage. When the maximum heating state detecting means has not yet detected the maximum heated states, the outside air from the outside air suction port is introduced into the first and second air passages.

Here, the maximum heating state includes the state in which the first and second heating adjusting means have a slight surplus heating amount. That is, it is applied to the case (1) in FIG. 17, the state includes not only that the air from the air blower passes through the heating heat exchanger by the air amount ratio adjusting means, but also that some small amount of air (e.g. 10%) flows through the bypass passage.

In this way, when the air amount ratio adjusting means corresponds to the maximum heating state, as in the case (1) in FIG. 17 the degree of the variation in the upper/lower temperature difference in accordance with the variation in the temperature of the outside air is low and therefore the degree of giving an uncomfortable feeling to the passenger is low even when the inside/outside air mode is set to the two-layer mode. Accordingly, at this time, the two-layer mode is set. In this way, it is possible to improve the heating performance for the passenger compartment as well as the frost prevention performance of the windshield.

On the other hand, when the two-layer mode is set in the state other than the maximum heating state, the problem similar to that in the case (2) in FIG. 17 inconveniently may occur. Therefore, at this time, the two-layer mode is not set and the mode in which the outside air is introduced into the both air passages is set. In this way, it is possible to prevent the occurrence of a variation in the upper/lower temperature difference in accordance with the variation in the temperature of the outside air, thereby eliminating the uncomfortable feeling given to the passenger.

According to another aspect of the present invention, the air conditioner includes air heating capacity detecting means for detecting an air heating capacity of said heating heat exchanger. When the air heating capacity detecting means has detected that the air heating capacity of the heating heat exchanger is equal to a predetermined capacity or less, the inside air from the first inside air suction port is introduced into the first air passage and the outside air from the outside air suction port is introduced into the second air passage. When the air heating capacity detecting means has not yet detected that the air heating capacity of said heating heat exchanger is equal to a predetermined capacity or less, the outside air from the outside air suction port is introduced into the first and second air passages.

The predetermined capacity means the minimum capacity which is needed to heat the passenger compartment to such an extent as not to give a feeling of cold air to the passenger.

The heating capacity, which is equal to the predetermined capacity or less, means that it is not possible to heat the passenger compartment to such an extent as not to give the feeling of cold air to the passenger. Therefore, according to the present invention, at this time, the two-layer mode is set. In this way, the warm inside air is introduced into the first air passage as compared with the case in which the outside air from the outside air suction port is introduced in each of the first and second air passages, and therefore it is possible to improve the heating capacity for the passenger compartment.

Also, when the air heating capacity is equal to the predetermined capacity or more, i.e., when it is possible to heat the passenger compartment to such an extent as not to give the feeling of cold air to the passenger, it is not always necessary to set the two-layer mode in order to improve the heating capacity. In the present invention, at this time, the outside air from the outside air suction port is introduced into each of the first and second air passages. Accordingly, it is possible to prevent the occurrence of a variation in the upper/lower temperature difference in accordance with the variation in the temperature of the outside air, thereby eliminating the uncomfortable feeling given to the passenger.

According to another aspect of the present invention, when the inside air from the first inside air suction port is introduced into the first air passage and the outside air from the outside air suction port is introduced into the second air passage, at least one of the first and second heating amount adjusting means is controlled in such a manner that temperatures of conditioned air in the first and second air passages, which are controlled by the first and the second heating amount adjusting means, respectively, approach to each other in accordance with the decrease in a temperature outside the passenger compartment.

In this way, the first and second heating amount adjusting means are respectively independently controlled, and temperatures of conditioned air in the first and second air passages are controlled so as to approach to each other in accordance with the decrease in a temperature outside the passenger compartment. As a result, it is possible to suppress the upper/lower temperature difference from increasing.

According to still another aspect of the present invention, the air conditioner further includes an inside air temperature sensor for detecting an air temperature in said passenger compartment, and an outside air temperature sensor for detecting an outside air outside the passenger compartment. When the outside air temperature detected by the outside air temperature sensor is lower than the inside air temperature detected by the inside air temperature detecting means by a predetermined temperature or more, at least one of the first and second heating amount adjusting means is controlled in such a manner that temperatures of conditioned air in the first and second air passages, which are controlled by the first and the second heating amount adjusting means, respectively, approach to each other.

In this way, when the outside air temperature is lower than the inside air temperature by a predetermined temperature or more, at least one of the first and second heating amount adjusting means is controlled in such a manner that temperatures of conditioned air in the first and second air passages approach to each other, and therefore the upper/lower temperature difference can be certainly reduced.

According to further another aspect of the present invention, the air conditioner includes a cooling heat exchanger provided in the first and second air passages, for cooling air in the first and second air passages, and refrigerant supply control means for controlling an amount of refrigerant supplied to the cooling heat exchanger. When supply of the refrigerant to the cooling heat exchanger is stopped by the refrigerant supply control means, at least one of the first and second heating amount adjusting means is controlled in such a manner that temperatures of conditioned air in the first and second air passages, which are controlled by the first and the second heating amount adjusting means, respectively, approach to each other in accordance with the decrease in a temperature outside the passenger compartment.

As illustrated on the right side of FIG. 13, when the refrigerant is supplied to the cooling heat exchanger, the upper/lower temperature difference is small, and as illustrated on the left side of FIG. 13, when the supply of the refrigerant to the cooling heat exchanger is stopped, the upper/lower temperature difference is large. Therefore, when the upper/lower temperature difference is large, the upper/lower temperature difference can be certainly reduced.

According to still another aspect of the present invention, the second heating amount adjusting means increases the heating amount of the air within the second air passage in accordance with the decrease in the temperature outside the passenger compartment.

In this way, since the heating amount of the air within the second air passage is increased by the second heating amount adjusting means, it is possible to give an uncomfortable feeling to the passenger due to the decrease in the temperature of the conditioned air.

According to further another aspect of the present invention, the air conditioner includes a first conditioned air temperature sensor for detecting a temperature of conditioned air in the first air passage, air-conditioned by the first heating amount adjusting means, and a second conditioned air temperature sensor for detecting a temperature of conditioned air in the second air passage, air-conditioned by the second heating amount adjusting means, and comfortable range determining means for determining whether a temperature difference between the temperatures detected by the first and second conditioned air temperature sensors is within a predetermined comfortable range. When it is determined by the comfortable range determining means that the temperature difference is within the comfortable range, the inside air from said first inside air suction port is introduced into the first air passage and the outside air from the outside air suction port is introduced into the second air passage. When it is determined by the comfortable range determining means that the temperature difference is not within the comfortable range, the outside air from the outside air suction port is introduced into the first and second air passages.

In this way, only when the upper/lower temperature difference is within the comfortable range where the passenger feels comfortable, the two-layer mode is set.

According to still another aspect of the present invention, the air conditioner includes frost condition detecting means for detecting a condition that said windshield may be frosted. When the frost conditions detecting means has detected such a condition, the outside air from the outside air suction port is introduced into the first and second air passages.

In this way, when there is a condition that the windshield may be frosted (for example, immediately after the passenger has gotten on the vehicle in the winter season), the outside air from the outside air suction port is introduced into the first and second air passages, and the frost prevention effect of the windshield is improved, because the amount of ventilation becomes larger than that in the two-layer mode.

According to still another aspect of the invention, the air conditioner includes first suction port opening/closing means for fully closing the communication passage when the first inside air suction port is fully opened and for fully opening the communication passage when the first inside air suction port is fully closed.

In this way, when the maximum heating state detecting means has detected the maximum heating state, the first inside air suction port is fully opened and the communication passage is fully closed, by means of the first suction port opening/closing means, thereby setting the two-layer mode.

When the maximum heating state detecting means has not yet detected the maximum heating state, the first inside air suction port is fully closed and the communication passage is fully opened, by means of the first suction port opening/closing means, thereby setting the outside air introduction mode in which the outside air is introduced into both air passages.

According to still another aspect of the invention, the air conditioner includes outside air introduction mode setting means for setting an outside air introduction mode in which the outside air from the outside air suction port is introduced into the first and second air passages, and second suction port opening/closing means for opening the outside air suction port when the outside air introduction mode has been set by the outside air introduction mode setting means.

In this way, when the outside air introduction mode has been set by the outside air introduction mode setting means, the outside air suction port is opened. Accordingly, if at this time the communication passage is closed, the inside/outside air mode is set to the two-layer mode. On the other hand, if at this time the communication passage is opened, the outside air introduction mode in which the outside air is introduced in the both air passages is set.

According to further another aspect of the present invention, the second air passage includes on the one end side a second inside air suction port for sucking the inside air, and the air conditioner includes second suction port opening/closing means for selectively opening or closing the outside air suction port and the second inside air suction port.

In this way, when the second suction port opening/closing means opens the outside air suction port and closes the second inside air suction port, if the communication passage is already closed, the inside/outside air mode is set to the two-layer mode. If the communication passage is opened, the inside/outside air mode is set to the outside air introduction mode in which the outside air is introduced into the both air passages. When the second suction port opening/closing means has closed the outside air suction port and opened the second inside air suction port, regardless of the opening or closing of the communication passage, the outside air introduction mode in which the inside air is introduced into the both air passages is set.

According to still another aspect of the present invention, the air conditioner includes maximum cooling state detecting means for detecting that both of said first heating amount adjusting means and said second heating amount adjusting means are in the maximum cooling state where each heating amount is substantially minimized, and the first inside air suction port is formed more adjacent to a suction portion of the air blower in the first air passage than the second inside air suction port. When the maximum cooling state detecting means has detected the maximum cooling state, the first inside air suction port is fully opened and the communication passage is fully closed by the first suction port opening/closing means.

By the way, when the first and second heating amount adjusting means are in the maximum cooled states, the inside air circulation mode is normally set, in which the second suction port opening/closing means closes the outside air suction port and opens the second inside air suction port. However, in the present invention, at this time, the inside air from the suction port of the first and second inside air suction ports which is nearer to the suction portion of the air blower in the first air passage is introduced into the first air passage. As a result, it is possible to reduce the air flow resistance, thereby obtaining a larger amount of air.

According to still another aspect of the present invention, when the state of said maximum heating state detecting means has changed from the state in which the maximum heating state is detected to the state in which the maximum heating state is not detected, after the position of the first suction port opening/closing means has changed from a position in which the first inside air suction port is fully opened and the communication passage is fully closed to a position in which said first inside air suction port is fully closed and the communication passage is fully opened, the heating amounts of the first and second heated air amount adjusting means are decreased.

In this way, during a time period in which the maximum heating state detecting means detects the maximum heating state, the two-layer mode is set, and further the first and second heating amount adjusting means are in the maximum heating states. That is, the warm inside air is introduced into the first air passage, and further the heating of the air from the air blower by the heating heat exchanger is maximized.

When the interior of the passenger compartment is warmed up to a certain extent and as a result the maximum heating state detecting means has stopped detecting the maximum heating state, if the air amount ratio adjusting means and the first suction port opening/closing means are simultaneously moved, the cold outside air instead of the warm inside air may be introduced into the first air passage, and in addition the heating amounts in the first and second heating amount adjusting means are decreased, thereby decreasing the temperature of the air blown out from the foot opening portion rapidly.

In the present invention, both the first suction port opening/closing means and the air amount ratio adjusting means are not moved simultaneously, but only the first suction port opening/closing means is moved at first and then the first and second heating amount adjusting means are moved. Therefore, it is possible to prevent the occurrence of the above-mentioned problems.

According to further another aspect of the present invention, when the state of the maximum heating state detecting means has changed from the state in which the maximum heating state is detected to the state in which the maximum heating state is not detected, after the heating amounts of the first and second heated air amount adjusting means has decreased, the position of the first suction port opening/closing means is changed from a position in which the first inside air suction port is fully opened and the communication passage is fully closed to a position in which the first inside air suction port is fully closed and the communication passage is fully opened. In this way, the same effect as that in the previous aspect can be obtained.

According to still another aspect of the invention, the air conditioner includes defroster mode instruction means for designating a defroster mode in which air is blown from the defroster opening portion toward the inner face of the windshield. When the defroster mode has been instructed by the defroster mode designating means, the first suction port opening/closing means is set at a position in such a manner as to fully close the first inside air suction port and to fully open the communication passage irrespective of a detection result of the maximum heating state detecting means.

In this way, when the outside air introduction mode is set, the outside air is introduced into the both air passages, and therefore it is possible to enhance the frost prevention performance of the windshield.

BRIEF DESCRIPTION OF THE ACCOMPANYING DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

A first embodiment of the present invention will now be described with reference to FIGS. 1 to 8.

In the first embodiment, each air conditioning device of an air conditioner unit for air conditioning a space in a passenger compartment of a vehicle having a diesel engine is controlled by an air conditioning controller unit 33 (hereinafter referred to as "ECU").

Figure 2:
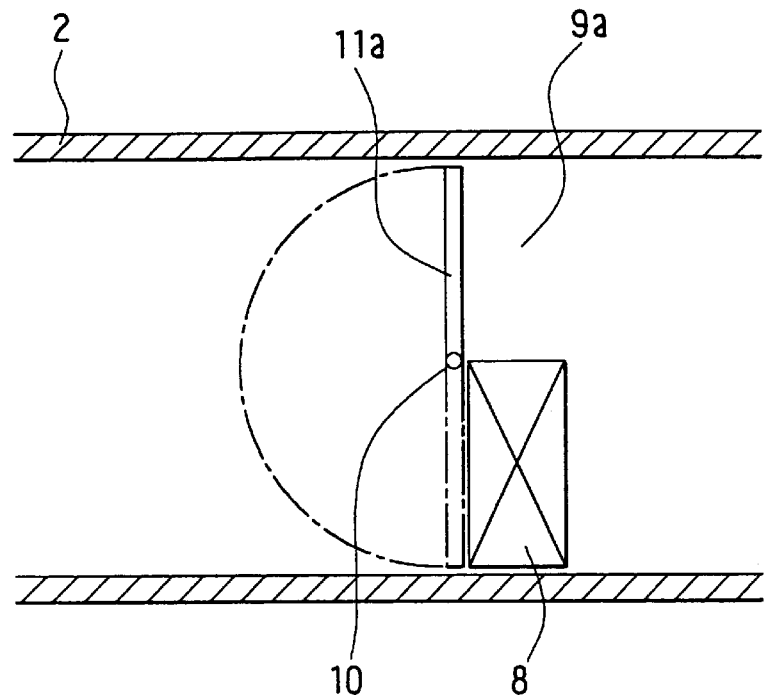
FIG. 2 is a view taken along the line II—II of FIG. 1.
Figure 3:
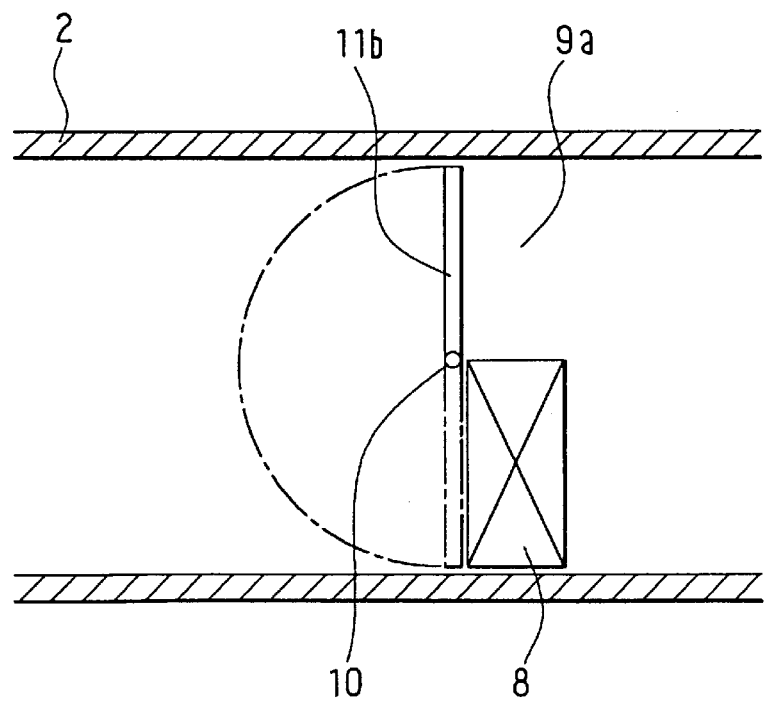
FIG. 3 is a view taken along the line III—III of FIG. 1.

First, the construction of the air conditioner unit will be described with reference to FIG. 1. FIG. 2 is a cross sectional view taken along line II—II of FIG. 1, and FIG. 3 is a cross sectional view taken along line III—III of FIG. 1.

Figure 1:
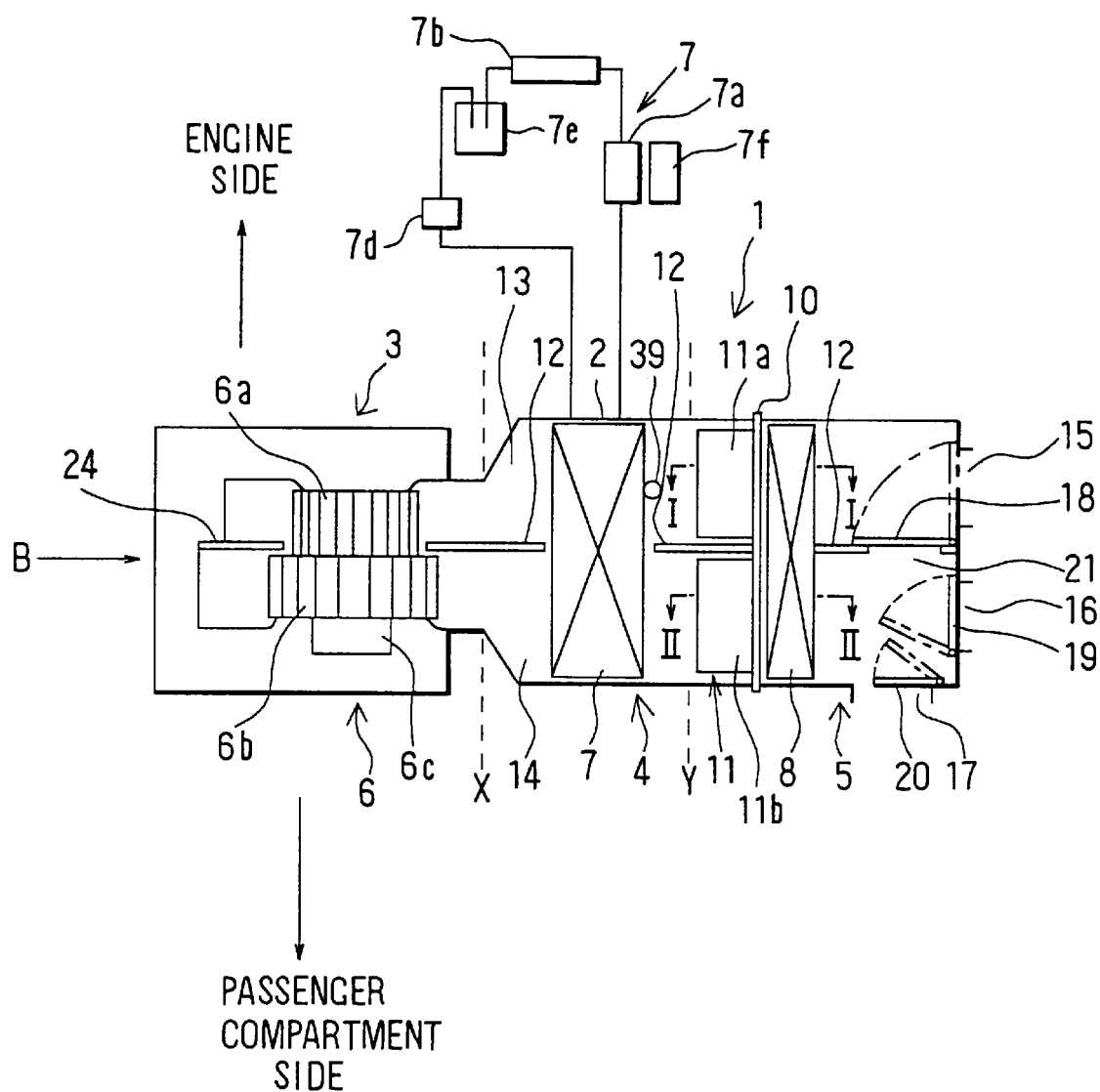
FIG. 1 is a view illustrating an entire construction of a ventilation system according to a first embodiment of the present invention.

The air conditioner unit 1 is mounted on the vehicle in such a manner that the upper part of FIG. 1 corresponds to the front side of the vehicle (engine side); the lower part of FIG. 1 corresponds to the rear side of the vehicle (passenger compartment side); and the rightward/leftward direction of FIG. 1 corresponds to the width direction of the vehicle. Also, the air conditioning unit 1 includes an air conditioning case 2 for forming an air passage for introducing the air conditioned air into the passenger compartment.

This air conditioning case 2 is made of resin material such as polypropylene and is constructed such that an inside/outside air blower unit 3, cooler unit 4 and heater unit 5 are connected to one another in this order. In FIG. 1, the broken lines X and Y in FIG. 1 represent these connecting portions.

The inside/outside air blower unit 3 sucks at least one, or both, of the inside and outside airs into the air conditioning case 2 and includes therein an air blower 6 for blowing air. The inside/outside air blower unit 3 and air blower 6 will be described later with reference to FIG. 3.

Within the cooler unit 4, there is disposed a refrigerant evaporator 7c for cooling air passing therethrough so as to entirely close the air passage in the air conditioning case 2. This refrigerant evaporator 7c constitutes a part of a refrigeration cycle apparatus 7 mounted on the vehicle. As illustrated in FIG. 1, the refrigeration cycle apparatus 7 includes a compressor 7a for compressing the refrigerant by means of the driving force of the engine of the vehicle, a condenser 7b for condensing and liquefying the compressed refrigerant, pressure reducer 7d for reducing pressure of the condensed and liquefied refrigerant, a receiver 7e for storing the liquid refrigerant therein, and the above-mentioned refrigerant evaporator 7c.

Also, in the refrigeration cycle apparatus 7, by supplying an electric current with an electromagnetic clutch 7f as intermitting means for intermitting an operation of the compressor 7a, the driving force of the engine is transmitted to the compressor 7a through this electromagnetic clutch 7f, the refrigerant is compressed by the compressor 7a, and this refrigerant is supplied to the refrigerant evaporator 7c (this state is hereinafter referred to as "the on-state of the compressor").

When the supply of the electric current to the electromagnetic clutch 7c is intermitted, the compressor 7a stops, and the supply of the refrigerant to the refrigerant evaporator 7c is stopped (this state is hereinafter referred to as "the off-state of the compressor 7b"). The supply of the electric current to the electromagnetic clutch 7f is controlled by the ECU 33 as described later.

Within the heater unit 5 there is provided a heater core 8 for heating the cool air having passed through the refrigerant evaporator 7c. As illustrated in FIG. 2 which is a sectional view taken along the line II—II of FIG. 1, the heater core 8 is a heat exchanger which is so provided in the air conditioning case 2 as to form a bypass passage 9 in which cool air flows, for bypassing the heater core 8. In the heater core 8, cooling water for cooling the engine flows and heats the cool air by using the cooling water as a heat source.

On the upstream air side of the heater core 8, a rotary shaft 10 is rotatably provided within the air conditioning case 2. To this rotary shaft 10, there are integrally connected plate-like air mix doors 11a and 11b so that the plate surfaces thereof may be coplanar with each other. Also, to the rotary shaft 10, there is connected a servo motor 40 (see FIG. 5). The air mix door 11a is disposed in the first air passage 13 described later, and the air mix door 11b is disposed in the second air passage 14 described later.

By rotating the rotary shaft 10 with the servo motor 40, the air mix door 11a is rotated between a solid line position and a chain line position of FIG. 2. That is, the air mix door 11a adjusts a ratio between the amount of the cool air passing through the heater core 8 and the amount of the cool air passing through the bypass passage 9a according to stop positions thereof as illustrated in FIG. 2, thereby adjusting the temperature of the air blown out into the passenger compartment.

The air mix door 11b adjusts a ratio between the amount of the cool air passing through the heater core 8 and the amount of the cool air passing through the bypass passage 9b according to stop positions thereof as illustrated in FIG. 3, thereby adjusting the temperature of the air blown out into the passenger compartment.

The cooler unit 4 and heater unit 5 are connected to each other by connecting means such as claw engagement or screw member. As illustrated in FIG. 1, within the cooler unit 4 and heater unit 5, a first air passage 13 and a second air passage 14 are formed by partitioning thereof by a partitioning wall 12 extending substantially in the vertical direction. The refrigerant evaporator 7c, the heater core 8 and the rotary shaft 10 are disposed in such a manner as to extend over both of the first air passage 13 and second air passage 14.

The bypass passage 9 includes two passages 9a and 9b formed in the first air passage 13 and second air passage 14, respectively, as illustrated in FIG. 1, by means of the partitioning wall 12.

At the most downstream end of the air conditioning case 2, there are formed a foot opening portion 15, a defroster opening portion 16 and a face opening portion 17.

To the foot opening portion 15, there is connected a foot duct (not illustrated), and the conditioned air introduced into the foot duct is blown out from a foot air outlet located at the downstream end of the foot duct toward the foot of the passenger within the passenger compartment.

To the defroster opening portion 16, there is connected a defroster duct (not illustrated), and the conditioned air introduced into the defroster duct is blown out from a defroster air outlet located at the downstream end of the defroster duct toward the inner surface of the front windshield of the vehicle.

To the face opening portion 17, there are connected a center face duct and side face duct (not illustrated). The conditioned air introduced into the center face duct of these ducts is blown out from a center face air outlet located at the downstream end of the center face duct toward the upper half of the body of the passenger within the passenger compartment while, on the other hand, the air conditioned air introduced into the side face duct is blown out from a side face air outlet located at the downstream end of the side face duct toward the side windshield of the vehicle.

On the upstream side positions of the opening portions 15 to 17, there are provided a foot door 18, a defroster door 19, and a face door 20, respectively. The foot door 18 opens or closes an air inflow passage leading to the foot duct, the defroster door 19 opens or closes an air inflow passage leading to the defroster duct, and the face door 20 opens or closes an air inflow passage leading to the center face duct.

Figure 5:
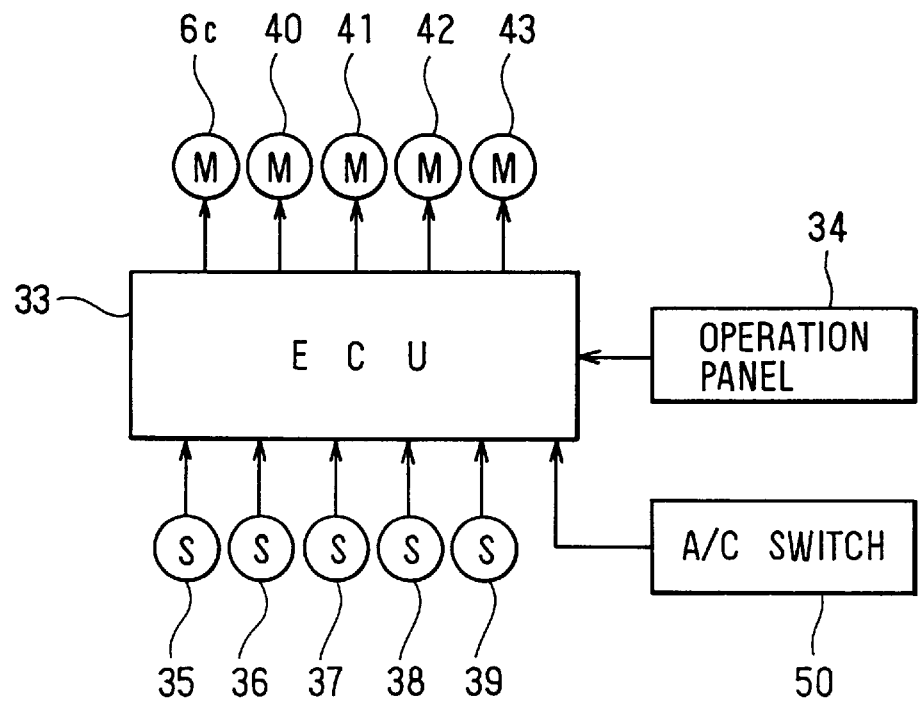
FIG. 5 is a block diagram illustrating a control system of the first embodiment of the present invention.

These doors 18 to 20 are connected to one another by means of a link mechanism (not illustrated), and this link mechanism is driven by a servo motor 41 (see FIG. 5). That is, by operating the link mechanism with the servo motor 41, the respective doors 18 to 20 are moved so that respective air outlet modes as described later may be obtained.

An air inflow passage leading to the side face duct is not opened or closed by the respective doors 18 to 20. In the vicinity of the side face air outlet, there is provided an air outlet grille (not illustrated) by which the passenger manually opens or closes the side face air outlet, and the air flow passage leading to the side face duct is opened or closed by the air outlet grille.

The partitioning wall 12 discontinues at a portion thereof located on the upstream air side of the opening portions 15 to 17 and on the downstream air side of the heater core 8. At this discontinued portion, there is formed a communication opening 21 which communicates between the first air passage 13 and the second air passage 14. The communication opening 21 is opened or closed by the foot door 18.

Figure 4:
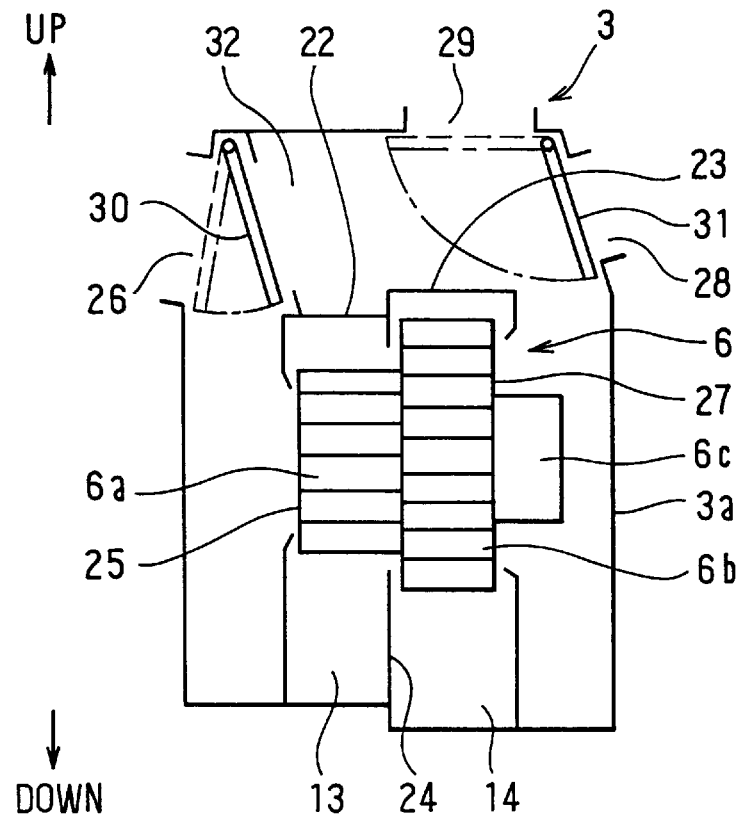
FIG. 4 is a schematic perspective illustration viewed from the direction indicated by the arrow B of FIG. 1.

Next, the inside/outside air blower unit 3 and air blower 6 will be described with reference to FIG. 4. FIG. 4 is a perspective illustration viewed from the direction indicated by the arrow B of FIG. 1.

As illustrated in FIG. 4, the inside/outside air blower unit 3 includes an inside/outside air case 3a that constitutes the most upstream air side of the air conditioning case 2 and the air blower 6 accommodated in the inside/outside air case 3a.

The air blower 6 is disposed substantially at the center of the interior of the inside/outside air case 3a and includes a first fan 6a, a second fan 6b, and a blower motor 6c for rotating these fans 6a and 6b. The first fan 6a and the second fan 6b are integrally formed and the diameter of the second fan 6b is larger than that of the first fan 6a.

These first and second fans 6a and 6b are accommodated in scroll casing portions 22 and 23, respectively, each of which is shaped like a bell-mouth. The terminal end portions (air outlet sides) of the scroll casing portions 22 and 23 are communicated with the first air passage 13 and second air passage 14, respectively. The scroll casing portions 22 and 23 commonly use a partitioning portion 24.

On the other hand, in the inside/outside air case 3a, a first inside air suction port 26 is formed in correspondence with a suction inlet 25 of the first fan 6a and a second inside air suction port 28 and outside air suction port 29 are formed in correspondence with a suction inlet 27 of the second fan 6b. In the inside/outside air case 3a, there are provided a first suction port opening/closing door 30 which opens or closes the first inside air suction port 26 and a second suction port opening/closing door 31 which opens or closes the second inside air suction port 28 and outside air suction port 29 selectively.

The first inside air suction port 26 is formed more adjacent to the position of the suction inlet 25 than the second inside air suction port 28. As described later, the position of the first suction port opening/closing door 30 is controlled according to whether or not the air mix doors 11a and 11b are located at a maximum hot position (maximum heating position) as described later, and the position of the second suction port opening/closing door 31 is controlled, as described later, according to the inside/outside air modes.

To the first suction port opening/closing door 30 and second suction port opening/closing door 31, there are connected servo motors 42 and 43 (see FIG. 5), and the respective doors 30 and 31 are rotated between a solid line position and a chain line position in the figure by means of these servo motors 42 and 43.

In the inside/outside air case 3a, there is formed a communication passage 32 which communicates between the second inside air suction port 28 or outside air suction port 29 and the suction inlet 25. When fully opening the first inside air suction port 26 (the solid line position of FIG. 4), the first suction port opening/closing door 30 fully closes the communication passage 32. When fully closing the first inside air suction port 26 (the chain line position of FIG. 4), the first suction port opening/closing door 30 fully closes the communication passage 32.

Next, a construction of a control system according to this embodiment will be described with reference to FIG. 6.

To the ECU 33 for controlling each air conditioning device of the air conditioner unit 1 there are input the signals from respective switches (e.g., a temperature setting switch used for setting the temperature in the passenger compartment) on an operation panel 34 provided on the front surface within the passenger compartment.

To the ECU 33 there are input the signals from an inside air temperature sensor 35 for detecting the temperature in the passenger compartment (the air temperature in the passenger compartment, hereinafter referred to as "the inside air temperature"), an outside air temperature sensor 36 for detecting the temperature outside the passenger compartment (the air temperature outside the passenger compartment, hereinafter referred to as "outside air temperature"), a sunlight amount sensor 37 for detecting an amount of sunlight entering the passenger compartment, a water temperature sensor 38 for detecting the temperature of the engine cooling water flowing into the heater core 8, and a post-evaporator sensor 39 for detecting the cooled degree of air in the refrigerant evaporator 7c (specifically, the temperature of the air immediately after passing through the evaporator). Further, to the ECU, an air conditioning switch 50 manually operated by the passenger, for switching the compressor 7a "on" or "off" is connected as an input terminal. In this embodiment, the post-evaporator sensor 38 is installed within the first air passage 13.

Within the ECU 33, there is provided a well known microcomputer including a CPU, ROM, RAM, and the like (not illustrated). After having been A/D converted by an input circuit (not illustrated) within the ECU 33, the signals from the respective sensors 35 to 39 are input to the microcomputer. When an ignition switch (not illustrated) of the engine of the vehicle has been turned "on", an electric power is supplied to the ECU 33 from a battery (not illustrated).

Next, the control process executed by the microcomputer according to this embodiment will be described with reference to FIG. 5.

First, when the ignition switch has been turned "on" and an electric power is supplied to the ECU 33, a routine of FIG. 5 is started, in step 100 respective initialization and initial settings are performed and then in step 110 the microcomputer inputs the set temperature set by the temperature setting device.

In the next step 120, the microcomputer reads in the signals which have been obtained by the A/D conversion of the values of the respective sensors 35 to 39.

In the next step 130, a target air temperature (TAO) of the air blown out into the passenger compartment is calculated according to the following equation (1) pre-stored in the ROM.

$$TAO = Kset \times Tset - Kr \times Tr - Kam \times Tam - Ks \times Ts + C \tag{1}$$

wherein Tset represents the set temperature set by the temperature setting device, Tr represents the detected value of the inside air temperature sensor 35, Tam represents the detected value of the outside air temperature sensor 36 and Ts represents the detected value of the sunlight amount 37. Kset, Kr, Kam and Ks represent gains, and C represents a correction constant.

Next, in step 140, the blower voltage corresponding to the TAO (the voltage applied to the blower motor 6c) is calculated from a map (not illustrated) pre-stored in the ROM.

In the next step 150, the air outlet mode corresponding to the TAO is determined from a map (not illustrated) pre-stored in the ROM. Herein, the air outlet mode may be set to the face mode, the bi-level mode, the foot mode, and the foot/def mode in this order, when the TAO is changed from the lower value to the higher value.

In the face mode, the foot door 18, the defroster door 19 and the face door 20 are set at the chain line position, the solid line position, and the chain line position of FIG. 1, respectively, so that the conditioned air is blown out toward the upper half of the body in the passenger compartment. In the bi-level mode, each of the foot door 18 and defroster door 19 is set at the solid line position and the face door 20 is set at the chain line position, so that the air conditioned air is blown out toward the upper body half and foot of the passenger.

In the foot mode, the face door 20 is set at the solid line position and the defroster door 19 is set at the position while keeping the defroster opening portion 16 slightly open, so that approximately 80% of the conditioned air is blown out toward the feet of the passenger and approximately 20% thereof is blown out toward the inner surface of the windshield.

In the foot/def mode, the foot door 18, the defroster door 19 and the face door 20 are set at the solid line position, the chain line position and the solid line position, respectively, so that the conditioned air is blown out toward both the feet of the passenger and the inner surface of the windshield with the same amount.

In this embodiment, when operating a defroster switch (not illustrated) provided on the operation panel 34, each of the foot door 18 and defroster door 19 is set at the chain line position and the face door 20 is set at the solid line position so that the conditioned air is blown out toward the inner surface of the windshield glass.

In any one of the air outlet modes, the side face air outlet is open or closed by the air outlet grille.

In step 160, the target opening degree (SW) of the air mix door 11 is calculated according to the following equation (2) pre-stored in the ROM. Since the air mix doors 11a and 11b are integrally rotated, these are hereinafter simply called as the air mix door 11 in this embodiment.

$$SW = ((TAO - Te)/(Tw - Te)) \times 100 (\%) \tag{2}$$

When the target opening degree is calculated as SW≦0 (%), the air mix door 11 is controlled to the position in which all the cool air from the refrigerant evaporator 7c passes through the bypass passage 9a and 9b. Also, when the target opening degree is calculated as SW≧100 (%), the air mix door 11 is controlled to the position in which all the cool air passes through the heater core 8. When the target opening degree is calculated as 0 (%)<SW<100 (%), the air mix door 11 is controlled to the position in which the cool air passes through both of the heater core 8 and the bypass passage 9.

Figure 7:
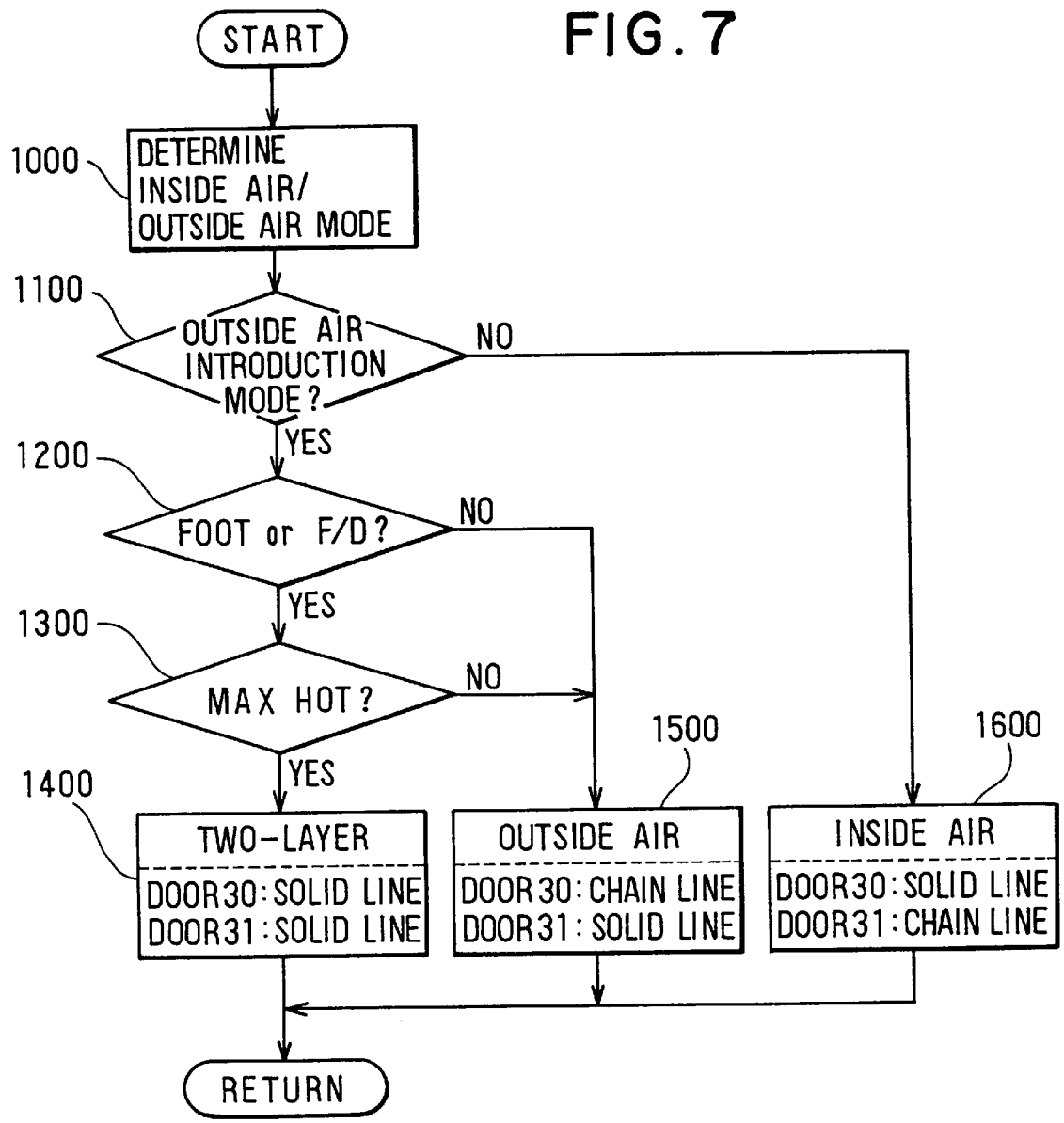
FIG. 7 is a flow chart illustrating a process of step 170 in FIG. 6.

When it proceeds to the next step 170, a subroutine illustrated in FIG. 7 is called, and the positions of the first suction port opening/closing door 30 and second suction opening/closing door 31 are determined.

Figure 8:
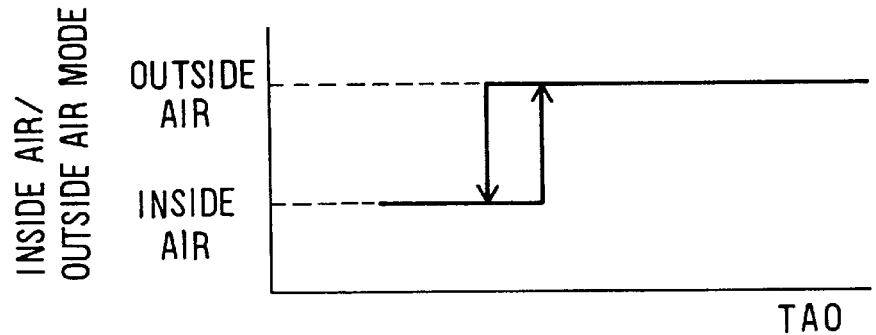
FIG. 8 is a view for explaining an inside/outside air mode according to the first embodiment.

Specifically, in step 1000 of FIG. 7, the inside/outside air mode is determined from the map of FIG. 8 pre-stored in the ROM.

In the next step 1100, it is determined whether the inside/outside air mode that has been determined in the step 1000 is the outside air introduction mode. Here, when determination is "NO", i.e., when the inside air circulation mode is determined, it jumps to step 1600 in which the position of the first suction port opening/closing door 30 is determined as the solid line position of FIG. 3 and the position of the second suction port opening/closing door 31 is determined as the chain line position of FIG. 4. That is, at this time, the mode in which the inside air is introduced into each of the first air passage 13 and second air passage 14 is set. Then, the process exits from this subroutine.

Figure 6:
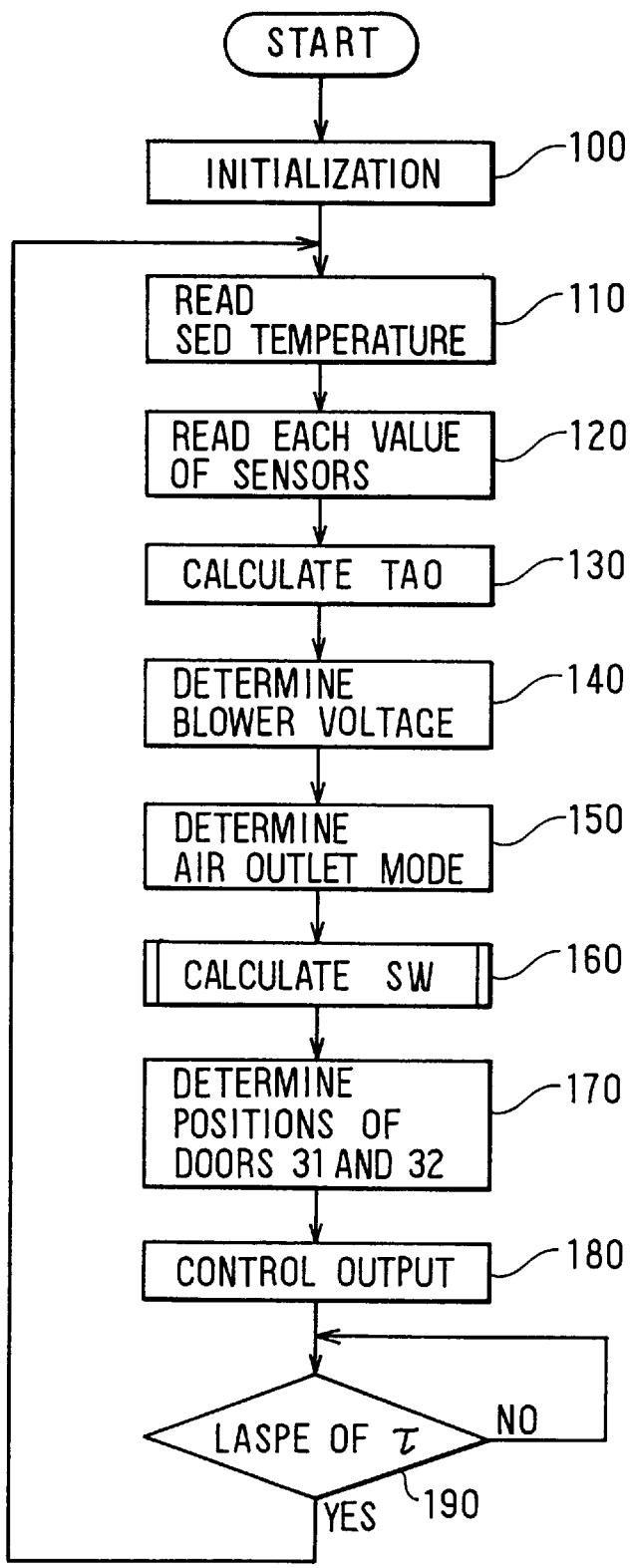
FIG. 6 is a flow chart illustrating a control process executed by a microcomputer according to the first embodiment.

When in step 1100 determination is "YES", it is determined in the next step 1200 whether or not the air outlet mode that has been determined in step 150 of FIG. 6 is the foot mode (FOOT) or foot/def mode (F/D). That is, it is determined whether or not this air outlet mode is the mode in which both the heating of the passenger compartment and the frost prevention of the windshield are performed. When in this step 1200 the determination is "NO", it jumps to step 1500 in which the position of the first suction port opening/closing door 30 is determined as the chain line position of FIG. 4 and the second suction port opening/closing door 31 is determined as the solid line position. That is, at this time, the mode in which the outside air is introduced into each of the both air passages 13 and 14 is set. Then, the process exits from this subroutine.

On the other hand, when in step 1200 determination is "YES", it is determined this time in step 1300 whether or not the target opening degree SW of the air mix door 11 which has been calculated in step 160 of FIG. 6 is 100 (%) or more. That is, it is determined whether or not the air mix door 11 is controlled to the position (the solid line position of FIGS. 2 and 3) (hereinafter referred to as "the maximum hot position") in which all the cool air from the refrigerant evaporator 7c passes through the heater core 8.

Here, when in step 1300 determination is "NO", it means that the heating capacity is in excess over the target temperature. Then, it proceeds to the step 1500, and the mode in which the outside air is introduced into the both air passages 13 and 14 is set. Conversely, when determination is "YES", it means that the heating capacity is insufficient for the target temperature. Then, it proceeds to step 1400, and the positions of the first suction port opening/closing door 30 and second suction port opening/closing door 31 are respectively determined as the solid line positions of FIG. 3. That is, it is determined that the two-layer mode in which the inside air is introduced into the first air passage 13 and the outside air is introduced into the second air passage 14 are set. Then, the process exits from this subroutine.

When a series of steps in FIG. 7 are terminated as mentioned above, it proceeds to the step 180 in FIG. 6, and control signals are output to the motors 6c and 40 to 43 so as to obtain the modes which have been calculated or determined in the above-mentioned steps 140 to 170.

In the next step 190, after the control cycle time period 96 has elapsed, it goes back to step 110.

In this embodiment, when the inside/outside air mode has been controlled to the mode which has been determined in step 1500 or 1600 of FIG. 7, the upper/lower temperature difference is tuned so as to be a comfortable temperature difference for the passenger.

As described above, according to this embodiment, when in step 1200 of FIG. 7 the determination is "YES", i.e., even when the inside/outside air mode needs to be the two-layer mode, the inside/outside air mode is set to the two-layer mode only when in the next step 1300 the air mix door 11 is set to the maximum hot position, i.e., when it has been determined that the heating capacity is insufficient for the target temperature.

Figure 17:
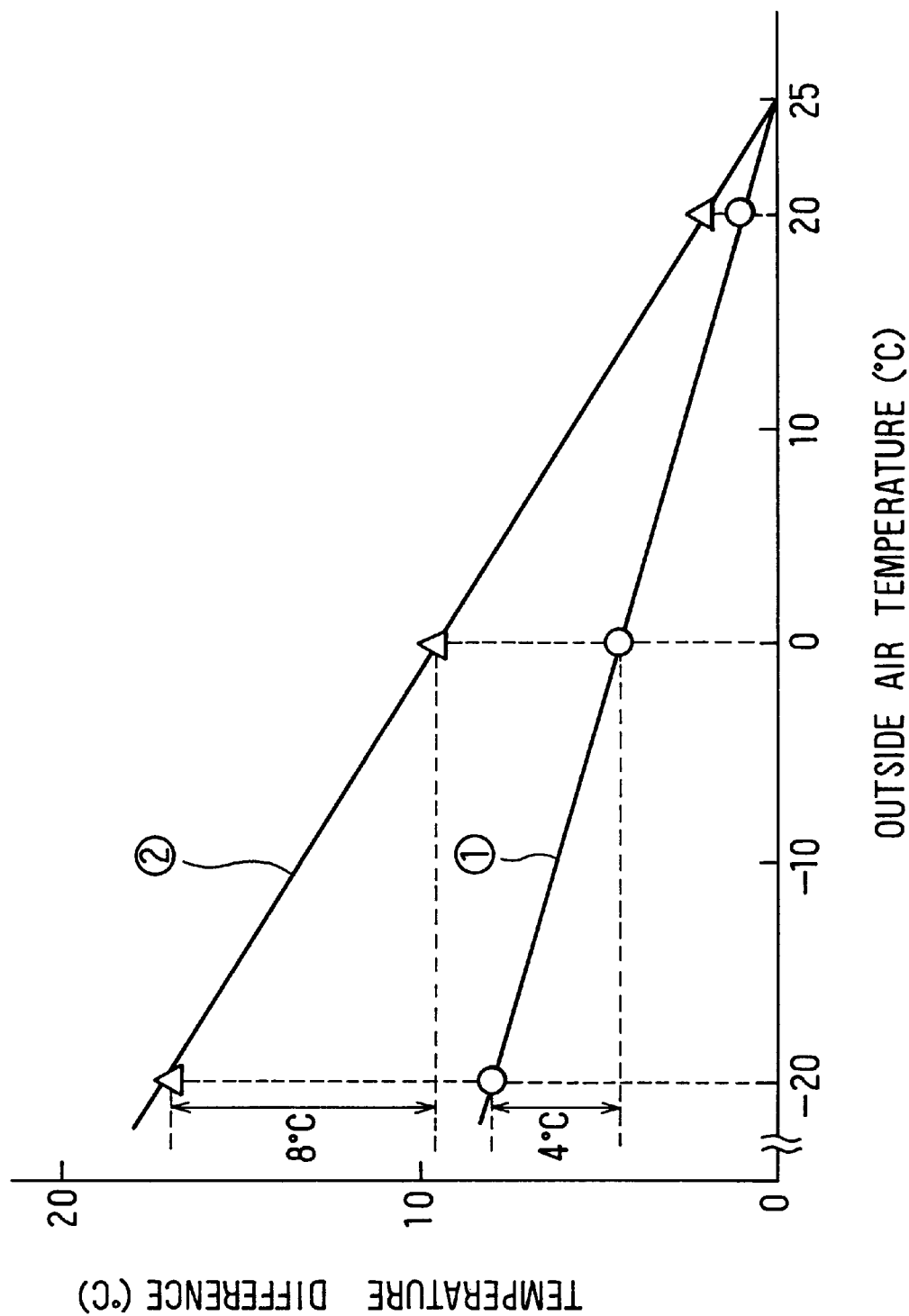
FIG. 17 is a graph showing an experimental results of the relationship between the outside air temperature and the temperature difference, for explaining the present invention.

Here, in a case where the air mix door 11 has been controlled to the maximum hot position, as in the case of A in FIG. 17 the degree of variation in the upper/lower temperature difference due to the change in the outside air temperature is low and therefore the degree for giving an uncomfortable feeling to the passenger is low even when the inside/outside air mode is set to the two-layer mode. Accordingly, at this time, by setting the two-layer mode, it is possible to improve the heating performance for the passenger compartment as well as the frost prevention performance of the windshield.

On the other hand, when in step 1300 it has been determined that the air mix door 11 should not be set to the maximum hot position, i.e., the heating capacity is in excess over the target temperature, if the two-layer mode is set, a problem in the same manner as in the case of B in FIG. 17 may be caused. Therefore, at that time, the two-layer mode is not set, and the mode in which the outside air is introduced into the both air passages 13 and 14 is set. In this way, it is possible to prevent the variation in the upper/lower temperature difference due to the change in the outside air temperature, thereby eliminating the uncomfortable feeling given to the passenger.

In this embodiment, when it has been determined in step 1100 of FIG. 7 that the inside/outside air mode is the inside air circulation mode, the first suction port opening/closing door 30 is set to the solid line position of FIG. 4 to introduce the inside air into the first air passage 13. Even when this door 30 is set to the chain line position of FIG. 4, the inside air is introduced into the first air passage 13, however, in this embodiment, since the inside air is introduced from the first inside air suction port 26 located more adjacent to the suction inlet 25 of the first fan 6a than the second inside air suction port 28 which is more apart from the suction inlet 25, it is possible to reduce the air flow resistance, thereby obtaining a larger amount of air.

In this embodiment, since the first inside air suction port 26 and the communication passage 32 are selectively opened or closed by the single first suction port opening/closing door 30, the number of the parts can be reduced as compared with a case where the door for opening and closing the first inside air suction port 26 and the door for opening and closing the communication passage 32 are respectively provided.

Next, a second embodiment of the present invention will be described.

This second embodiment differs from the above-mentioned first embodiment only in the process executed in step 170 of FIG. 6. The process will now be described.

Figure 9:
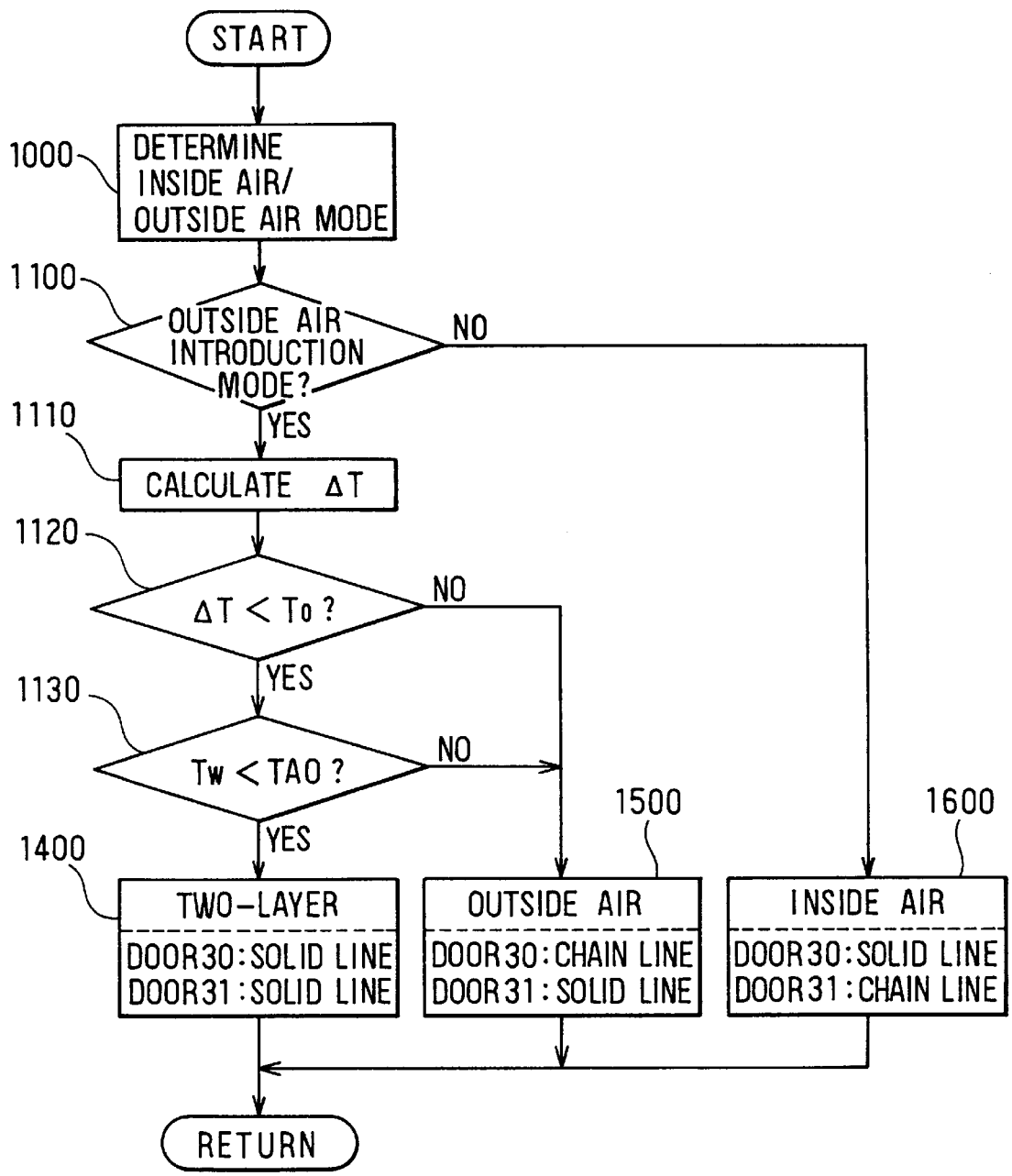
FIG. 9 is a flow chart illustrating a process of step 170 according to a second embodiment of the present invention.

When it proceeds to step 170 of FIG. 6, a subroutine illustrated in FIG. 9 is called, and the same process in steps 1000 and 1100 of FIG. 7 are executed. When in step 1100 the determination is "YES", it proceeds to step 1110, and the temperature difference $\Delta T$ between the inside air temperature and the outside air temperature is calculated according to the following equation (3) pre-stored in the ROM.

$$\Delta T = Tr - Tam (°C.) \quad (3)$$

wherein Tr represents the detected value of the inside air temperature sensor 35 and Tam represents the detected value of the outside air temperature sensor 36.

In the next step 1120, it is determined whether the temperature difference ΔT is smaller than a predetermined temperature T0 (in this embodiment, 15° C.). Here, when the determination is "YES", the interior of the passenger compartment has not yet been warmed up sufficiently. Therefore, when the passenger has gotten on the vehicle, the front windshield may be frosted, and it proceeds to step 1500. As a result, since the amount of ventilation increases as compared with the case where the two-layer mode is set, the effect of the frost prevention of the windshield is increased.

When in step 1120 the determination is "NO", the front glass is hardly frosted, it proceeds to the next step 1130, and it is determined whether the water temperature Tw which has been detected by the water temperature sensor 38 is lower than the target air temperature TAO. Here, when the determination is "YES", the heating for the passenger compartment cannot be performed to such an extent as not to give a feeling of cool air to the passenger. Accordingly, at this time, it proceeds to step 1400. As a result, since the warm inside air is introduced into the first air passage 13, it is possible to improve the heating capacity for the passenger compartment as compared with the case where it proceeds to step 1500.

The determinations in steps 1120 and 1130 are performed by a well known method to which the hysteresis is provided.

In the above-described second embodiment, when the water temperature Tw of the water flowing through the heater core 7 is lower than the target air temperature TAO, i.e., when the air of the temperature represented by the TAO cannot be blown out into the passenger compartment and a feeling of cool air may be given to the passenger, by setting to the two-layer mode, the heating capacity for the passenger compartment is improved, thereby preventing the above problem.

When the water temperature Tw is higher than the target blowout temperature TAO, the two-layer mode is not always needed to improve the heating capacity. In this embodiment, at this time, the mode in which the outside air from the outside air suction port 29 is introduced into each of the first and second air passages 13 and 14 is set. Accordingly, it is possible to prevent the occurrence of variation in the upper/lower temperature difference due to the change in the temperature of the outside air and to eliminate the uncomfortable feeling given to the passenger.

When it has been determined that the inside/outside air temperature difference ΔT is smaller than the predetermined temperature T0 and the front windshield may be frosted, even if the water temperature Tw is lower than the target air temperature TAO, the inside/outside air mode is set to the mode in which the outside air from the outside air suction port 29 is introduced into each of the first and second air passages 13 and 14. Therefore, since the amount of ventilation increases as compared with the case where the two-layer mode is set, the effect of the frost prevention of the windshield can be increased.

Next, a third embodiment of the present invention will be described.

In this third embodiment, the air mix doors 11*a* and 11*b* are respectively independently controlled as compared with the above-mentioned embodiments, and the main feature is characterized in the contents of the control of the air mix doors 11*a* and 11*b*. In this embodiment, the ECU 33 controls the air conditioner unit, as illustrated in FIGS. 10 and 11.

Figure 10:
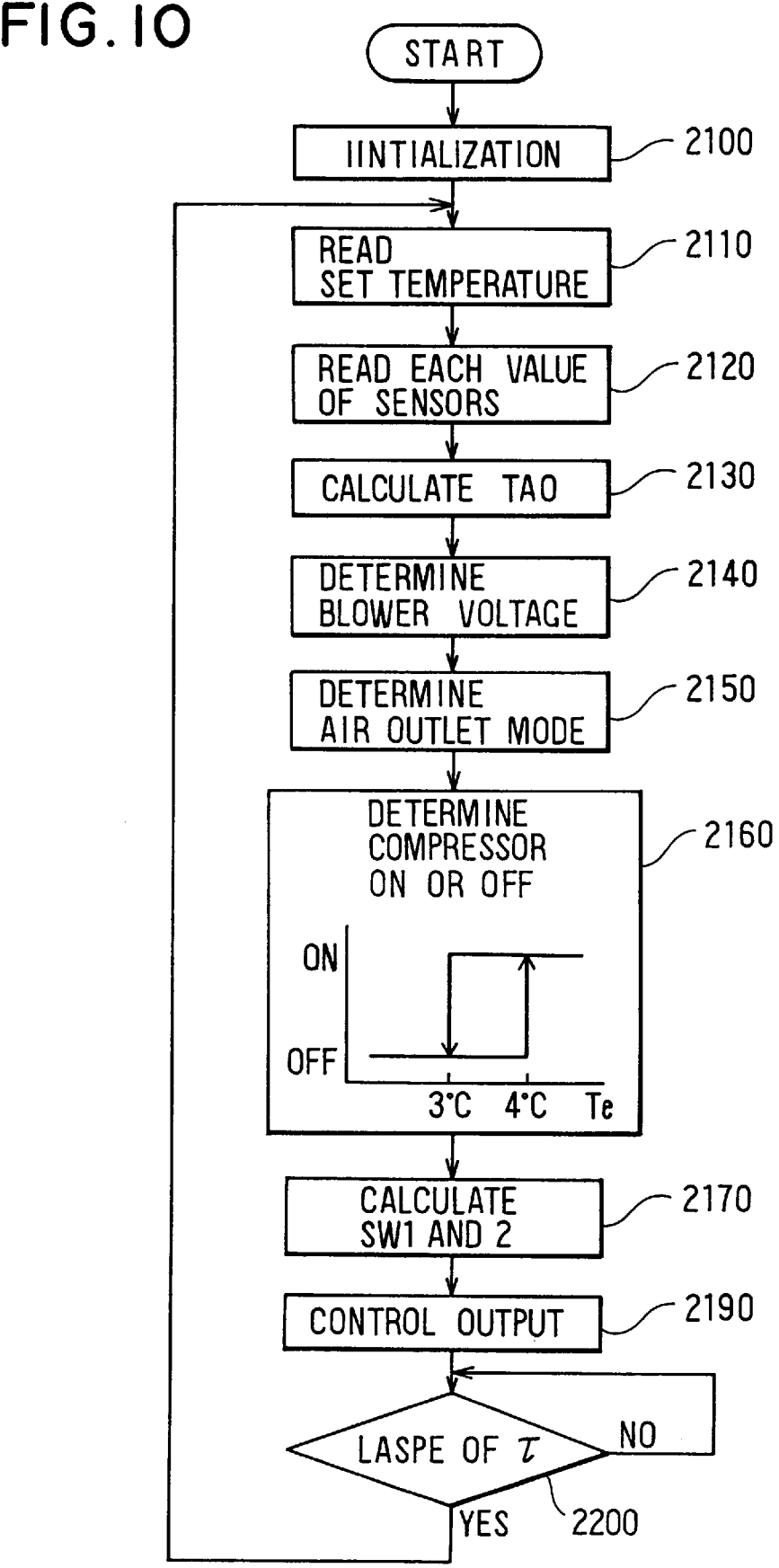
FIG. 10 is a flow chart illustrating a control process executed by the microcomputer according to a third embodiment of the present invention.
Figure 11:
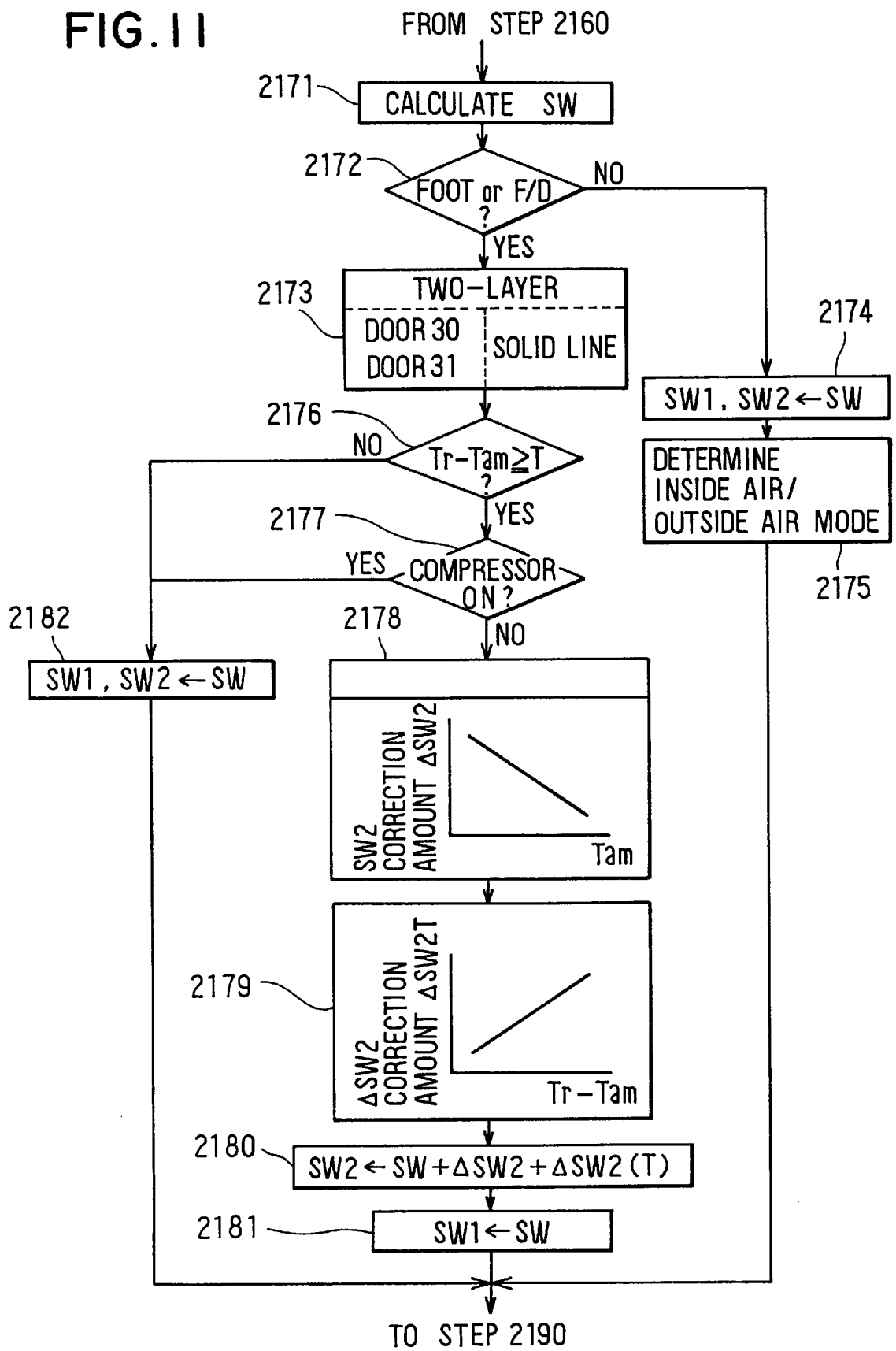
FIG. 11 is a flow chart illustrating the processing of step 2170 in FIG. 10.

Since the process from step 2100 to step 2150 in FIG. 10 are the same as the process from step 100 to step 150 in FIG. 6, the step 2190 is the same as the step 180 in FIG. 6 and the step 2200 is the same as the step 190 in FIG. 6, descriptions thereof are omitted.

In step 2160, it is determined whether or not the compressor 7*a* is turned "on" to supply the refrigerant with the evaporator 7*c*. The on/off operation of the compressor 7*a* is determined from a characteristic diagram illustrated in step S2160. That is, when the detected temperature Te of the post-evaporator sensor 39 is lower than 3° C., the compressor 7*a* is turned "off", on the other hand, when the detected temperature Te is higher than 4° C., the compressor 7*a* is turned "on". The set value of 3° C. is set so that the refrigerant evaporator 7*c* is prevented from being frosted and the cooling capacity thereof is prevented from being decreased. The on/off operation of the compressor 7*a* is not performed while the air conditioning switch 50 is "off". Once the air conditioning switch 50 is turned "off", the compressor 7*a* will not be turned "on" as long as the air conditioning switch 50 is not turned "on".

Next, in step 2170, the target opening degrees SW1 and SW2 of the air mix doors 11*a* and 11*b* are calculated, this step 2170 will be described in detail with reference to FIG. 11.

First, in step 2171, the temporary target opening degrees SW of the air mix doors 11*a* and 11*b* are calculated according to the equation (2) pre-stored in the ROM. In this case, each od the temporary target opening degrees of the air mix doors 11*a* and 11*b* is represented by SW.

Next, in step 2172, it is determined whether or not the air outlet mode which has been determined in the step 2150 is the foot mode (FOOT) or foot/def mode (F/D).

When in step 2172 the determination is "YES", i.e., when it is determined that the air outlet mode is the foot mode or foot/def mode, it proceeds to step 2173, it is determined that the positions of the doors 30 and 31 are set at the solid line positions in FIG. 3, respectively, in order to set the inside/outside air mode to the two-layer mode.

On the other hand, when in step 2172 the determination is "NO", i.e., when it is determined that the air outlet mode is the face mode or bi-level mode, it proceeds to step 2174, and the target opening degrees SW1 and SW2 are finally determined to be the target opening degrees SW which have been calculated in step 2171. Then, it proceeds to step 2175, and the inside/outside air mode is determined from the TAO calculated in step S2130 and the relation diagram illustrated in FIG. 7. It proceeds to step 2190, and control signals are output so as to obtain the control target values which have been determined in the above-mentioned respective steps.

In the next steps 2176 and 2177, it is determined whether or not, when the air mix doors 11*a* and 11*b* have the same opening degrees, the above-mentioned upper/lower temperature difference becomes large to such an extent as to give an uncomfortable feeling to the passenger. Based on the results of this determination, the opening degree of each of the air mix doors 11*a* and 11*b* is controlled.

The control process executed in step 2176 and the following steps will be described in detail.

First, in step 2176, it is determined whether or not the outside air temperature Tam is lower than the inside air temperature Tr by a predetermined value T or more When in step 2176 the determination is "YES", i.e., when it is determined that the outside air temperature Tam is lower than the inside air temperature Tr by the predetermined value T or more, it proceeds to step 2177. Also, when in step 2176 the determination is "NO", i.e., when there is no great difference between the outside air temperature Tam and the inside air temperature Tr, it proceeds to step 2182, and each of the SW1 and SW2 is set to be the temporary target opening degree which has been calculated in step 2171.

In this way, the air mix doors 11*a* and 11*b* have the same opening degrees. Since the outside air temperature Tam is lower than the inside air temperature Tr, the temperature of the conditioned air that is blown from the defroster opening portion 16 becomes lower than the temperature of the conditioned air that is blown from the foot opening portion 15. However, in this case, since the difference between the inside air temperature Tr and the outside air temperature Tam is not so large, the upper/lower temperature difference is relatively small.

Figure 12:
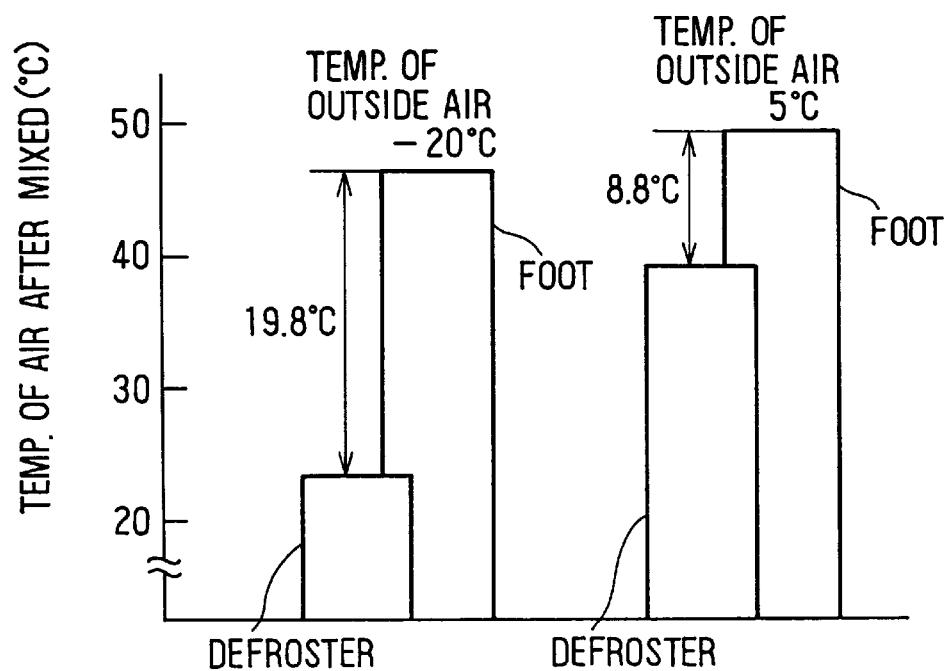
FIG. 12 is a correlation graph illustrating a correlation between the decrease in the temperature of the outside air and the upper/lower temperature difference according to the third embodiment.

The inventors have examined the correlation with the temperature differences (upper/lower temperature differences) between the air conditioned airs blown from the defroster opening portion 16 and foot opening portion 15 and varies according to the decrease in the outside air temperature Tam when the air mix doors 11a and 11b have the same opening degrees. The results of the examination are shown in FIG. 12. The experimental conditions were such that the inside air temperature was 25° C., the compressor 7a was "off", and the opening degrees of the air mix doors 11a and 11b were in a range of the air mix (A/M) where the cool air and warm air were mixed with each other.

As can be understood therefrom, in the graph of FIG. 11, there exists a great difference between the right side data in which the difference between the outside air temperature and the inside air temperature is small (i.e., the upper/lower temperature difference is 8.8° C.) and the left side data in which the difference between the outside air temperature and the inside air temperature is large (i.e., the upper/lower temperature difference is 19.8° C.).

That is, in the foot mode or foot/def mode, on the condition that the inside air temperature is set to a fixed value of 25° C., when the outside air temperature is lowered, for example while the vehicle is traveling in a tunnel or the like, the temperature difference between the inside air and outside air introduced into the first air passage 13 and second air passage 14 becomes larger.

If the opening degree of the air mix door 11b for adjusting the temperature of the conditioned air within the second air passage 14 remains unchanged, the temperature difference between the temperature of the conditioned air blown out from the defroster opening portion 16 and the temperature of the conditioned air blown out from the foot opening portion becomes larger (the temperature of the conditioned air blown out from the defroster air outlet is lowered), and an uncomfortable feeling is given to the passenger.

That is, the above-mentioned predetermined temperature T is set in such a manner that the upper/lower temperature difference does not give an uncomfortable feeling to the passenger even when the air mix doors 11a and 11b have the same opening degrees.

Next, in step 2177, it is determined whether or not the compressor 7a is "on". In this step 2177, it is determined whether or not the air conditioning switch 50 is "off".

When in step 2177 the determination is "NO", i.e., when it is determined that the compressor 7a is "off", it proceeds to step 2178, and the target opening degree SW2 of the air mix door 11b is calculated.

In this embodiment, the opening degree of the air mix door 11b is corrected so as to reduce the upper/lower temperature difference, however, the opening degree of the air mix door 11b is corrected when it has been determined in step 2177 that the compressor 7a is "off".

That is, the problem that the upper/lower temperature difference becomes excessively large and an uncomfortable feeling is given to the passenger is likely to occur when the temperature difference between the inside air and outside air that introduced into the first air passage 13 and second air passage 14 is large, however, does not essentially occur so often when the temperature difference is small.

Figure 13:
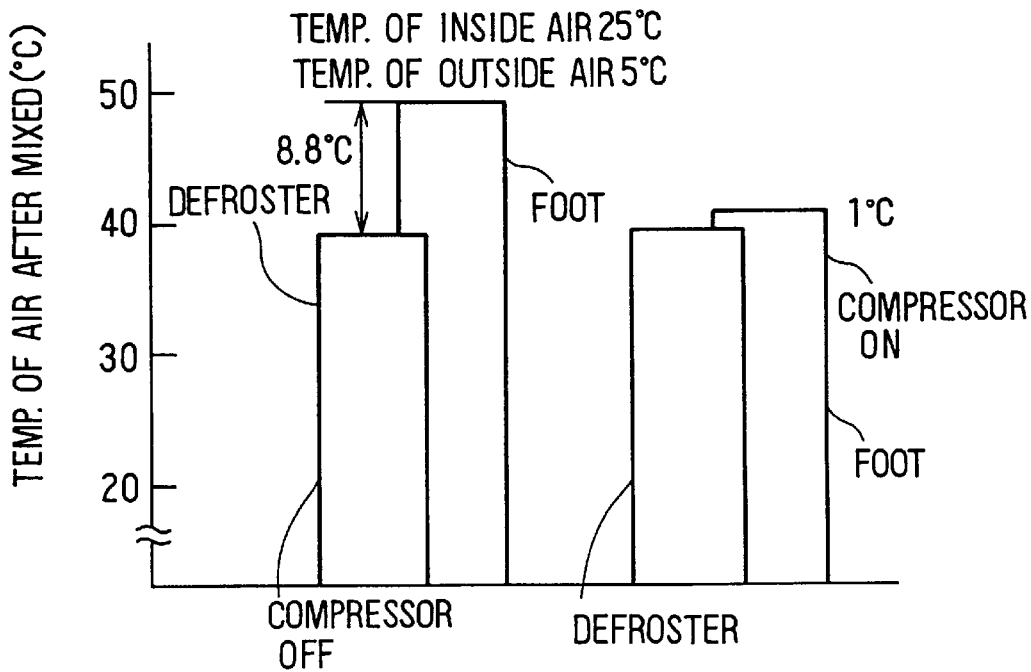
FIG. 13 is a correlation graph illustrating the correlation between the on/off operations of a compressor and the upper/lower temperature difference according to the third embodiment.

In this embodiment, when the compressor 7a is "off", the opening degree of the air mix door 11b is corrected. In the experimental data in FIG. 13, which have been examined by the inventors, when the compressor 7a is "on", the difference between the temperature of the inside air in the first air passage 13 after being air-mixed and the temperature of the outside air in the second air passage 14 after being air-mixed becomes smaller.

That is, when the air conditioning switch 50 is turned "off" by the passenger, the compressor 7a remains "off" as long as the air conditioning switch 50 is not turned "on" again. Accordingly, when the outside air is at 8° C. and the inside air is at 25° C. for example, if the compressor 7a is "on", since the refrigerant evaporator 7c has the refrigerant supplied thereto and as a result the temperature becomes approximately 3 to 4° C., the outside air is cooled and becomes lower than 5° C. On the other hand, the inside air is sufficiently cooled by the refrigerant evaporator 7c down to, for example, 10° C. In this way, when the compressor 7a is "on", the temperature difference between the temperatures of the inside and outside airs becomes smaller by the refrigerant evaporator 7c.

On the other hand, when the compressor 7a is "off", since no refrigerant is supplied to the refrigerant evaporator 7c, the cooling capacity thereof is small. Considering that the cooling capacity is zero, the difference in temperature between the inside air and the outside air does not almost vary even when these airs have passed through the refrigerant evaporator 7c, as compared with the case where the compressor 7a is "on".

Such an operation remarkably occurs particularly when the compressor 7a is turned "off" with the air conditioning switch 50 operated by the passenger and the time period during which the "off" is continued is very large and the air conditioning switch 50 is turned "on" again.

Accordingly, in this embodiment, the opening degrees of the air mix doors 11a and 11b are corrected in steps 2178 and 2179 when the compressor 7a is "off".

First, in step 2178, the amount of correction ΔSW2 is determined to correct the temporary target opening degree of the air mix door 11b which has been calculated in step 2171.

Specifically, the opening degree correction amount ΔSW2 for correcting the opening degree of the air mix door 11b is set so as to become larger in accordance with the decrease in the outside air temperature Tam.

That is, the lower the outside air temperature Tam becomes, the lower the temperature of the conditioned air is blown out from the defroster opening portion 16 becomes, and as a result, the larger the upper/lower temperature difference becomes. Therefore, in order to reduce the upper/lower temperature difference, the correction amount ΔSW2 is set so as to become larger in accordance with the decrease in the outside air temperature Tam.

Next, in step 2179, the correction amount ΔSW2T is determined to correct the opening degree of the air mix door 11b. That is, in this embodiment, the post-evaporator sensor 39 is installed within the first air passage 13. In this way, the temporary target opening degree SW on the first air passage 13 side, which is calculated according to the equation (2), becomes an opening degree in compliance with the actual passenger's feeling of warmth in the air conditioned environment.

However, since in this embodiment the post-evaporator sensor is not provided on the second air passage 14 side, the SW value on the second air passage 14 side becomes far away from an opening degree in compliance with the actual passenger's feeling of warmth. Since the inside air is introduced into the first air passage 13 and the outside air is introduced into the second air passage 14, if a post-evaporator sensor is disposed in the second air passage 14, the detected value thereof becomes much smaller than the detected value of the post-evaporator sensor 39 on the first air passage 13 side.

Therefore, in step 2179, the difference between the detected temperature of the post-evaporator sensor 39 and the actual temperature of the air immediately after passing through the refrigerant evaporator 7c in the second air passage 14, the correction amount ΔSW2T is determined so as to become larger in accordance with the increase of the difference between the temperatures of the airs on the suction side of the evaporator in the respective air passages, i.e., the difference between the inside air temperature Tr and outside air temperature Tam.

Then, it proceeds to step 2180, and the target opening degree SW2 is set by adding the ΔSW2 and ΔSW2T to the SW. Then, it proceeds to step 2181, and the SW1 is set to the SW. In this way, it is possible to suppress the increase of the upper/lower temperature difference due to the decrease in the temperature of the outside air.

As described above, in the air conditioner in which the air mix doors 11a and 11b are controlled independently, it is possible to suppress the increase in the upper/lower temperature difference due to the decrease in the temperature of the outside air. Also, since the opening degree of the air mix door 11b lowering the temperature of the air conditioned air is corrected so as to become larger in accordance with the decrease in the temperature of the outside air, it is possible to prevent the uncomfortable cool feeling due to the conditioned air blown out from the defroster opening portion 16 from giving to the passenger.

When in step 2177 it is determined that the compressor 7a is "on", it proceeds to step 2182. However, in this case, the upper/lower temperature difference is almost not caused i.e., 1° C., because the temperature of the conditioned air blown out from the foot opening portion 15 is largely lowered as illustrated in FIG. 12 when the compressor 7a is switched from "off" to "on".

In this embodiment, it proceeds to step 2182, and each of the SW1 and SW2 is set to the temporary opening degree SW which has been calculated in the step 2171.

Figure 14:
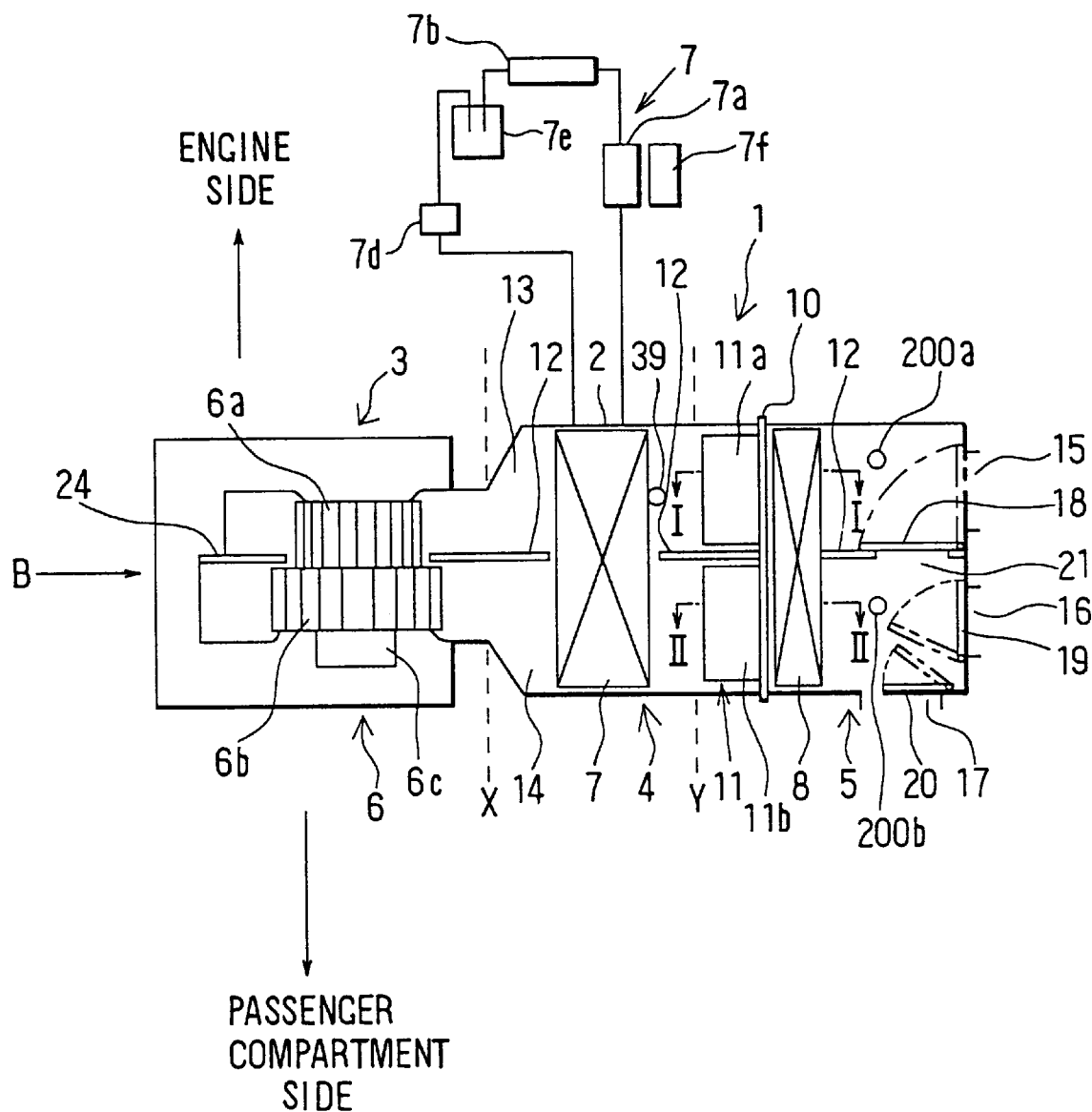
FIG. 14 is a view illustrating an entire construction of a ventilation system according to a fourth embodiment of the present invention.

Next, a fourth embodiment of the present invention will be described. The fourth embodiment slightly differs from the first embodiment with reference to FIGS. 1 and 7. More specifically, as illustrated in FIG. 14, the inside air side temperature sensor 200a is disposed on a downstream air side of the heater core 8 in the first air passage 13, and the outside air side temperature sensor 200b is disposed on a downstream air side of the heater core 8 in the second air passage 13.

The inside air side temperature sensor 200a detects the temperature of conditioned air, which is adjusted by the air mix door 11a, in the first air passage 13. The outside air side temperature sensor 200b detects the temperature of conditioned air, which is adjusted by the air mix door 11b, in the second air passage 14. The inside air side temperature sensor 200a is disposed at a position so as to preferably mix (air-mix) the warm air passing through the heater core 8 in the first air passage 13 and the cool air passing through the bypass passage 9a.

The outside air side temperature sensor 200b is also disposed at a position so as to preferably mix (air-mix) the warm air passing through the heater core 8 in the second air passage 14 and the cool air passing through the bypass passage 9b. These inside air side temperature sensor 200a and outside air side temperature sensor 200b are connected to input terminals of the ECU 33 in FIG. 5.

Figure 15:
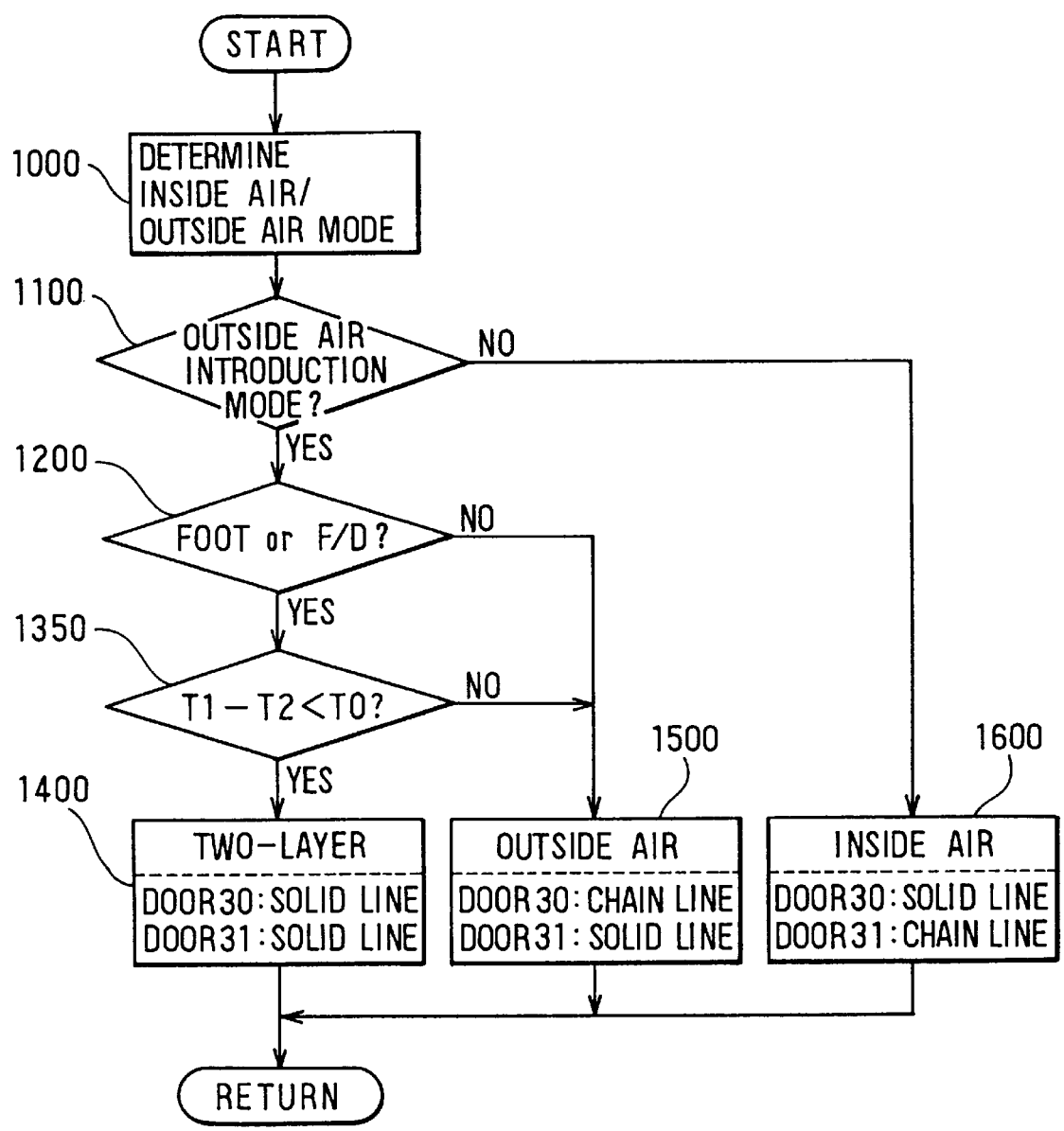
FIG. 15 is a flow chart illustrating a process of step 170 in FIG. 6 according to the fourth embodiment.

In this embodiment, the following air conditioning control is performed by using the inside air side temperature sensor 200a and the outside air side temperature sensor 200b. Such an air conditioning control process will be described with reference to FIG. 15. Only the step 1350 in FIG. 15 differs from the step 1300 in FIG. 7, and the descriptions of the other steps are omitted herein.

When the foot mode or the foot/def mode is determined in step 1200, it proceeds to step 1350, and it is determined whether or not the difference between the temperature T1 of conditioned air detected by the inside air side temperature sensor 200a and the temperature T2 of conditioned air detected by the outside air side temperature sensor 200b is within the predetermined comfortable range of the temperature T0. In this embodiment, the above T0 is set to 30° C.

When in step 1350 the determination is "YES", i.e., the difference is within the predetermined range T, it proceeds to step 1400, and the two-layer mode is set. On the other hand, when in step 1350 the determination is "NO", i.e., the difference is not within the predetermined range T, it proceeds to step 1500, and the outside air introduction mode is set.

Accordingly, in the embodiment, when the difference is within the predetermined range T, it is determined that the passenger feels comfortable, and the two-layer mode is set. On the other hand, when the outside air temperature Tam is extremely low and the difference between the outside air temperature Tam and the inside air temperature Tr is very large, the difference is beyond the predetermined range T, it is determined that the passenger does not feel comfortable, and the outside air introduction mode is set.

In this way, only when the upper/lower temperature difference is within the range where the passenger feels comfortable, the air conditioning control is performed with the two-layer mode. The above T (in this embodiment 30° C.) may be set depending on the vehicle.

A fifth embodiment of the present invention will be described.

Further to the construction of the above-mentioned embodiment, there may be added a step for determining whether or not the air mix doors 11a and 11b are controlled to the position (the chain line position of FIGS. 2 and 3) (hereinafter referred to as "the maximum cool position") in which all the cool air from the refrigerant evaporator 7c passes through the bypass passage 9 by determining whether or not the SW is 0 (%) or less. When in this step determination is "YES", the first suction port opening/closing door 30 may be controlled to the solid line position of FIG. 3.

In this case, when the second suction port opening/closing door 31 is located at the chain line position of FIG. 4, the inside air is introduced from the first inside air suction port 26 which is more adjacent to the suction openings 25 of the first fan 6a than the second inside air suction port 28 which is more apart therefrom, and it is possible to reduce the air flow resistance low, thereby obtaining a larger amount of air. When the air mix doors 11 are located at the maximum cool position, the second suction port opening/closing door 31 is controlled to the chain line position of FIG. 4.

Next, a sixth embodiment of the present invention will be described.

In each of the above-mentioned first to third embodiments, although the microcomputer of the ECU 33 determines the inside/outside air mode in the step 1000 in each of FIGS. 7 and 9, in this embodiment, there is no such function but provided an inside/outside air mode setting switch on the operation panel 34 (FIG. 5). The signal from this switch is input to the ECU 33, and in accordance with the state of this signal, the positions of the doors 30 and 31 are controlled.

In this embodiment, there is no process of step 1000 in FIGS. 7 and 9. When the subroutine in FIG. 7 or 9 is called, the process of step 1100 is immediately executed. In this step 1100, it is determined whether or not the outside air introduction mode has been set by the inside/outside air mode setting switch.

Next, a seventh embodiment of the present invention will be described.

In this embodiment, on the operation panel 34 (FIG. 5), there are provided a temperature setting lever for setting the position of each of the air mix doors 11a and 11b, an air outlet mode setting lever for setting the blowout mode and an inside/outside air mode setting lever for setting the inside/outside air mode.

Also, in the air conditioning case 2, there are provided a maximum hot switch for detecting whether each position of the air mix doors 11a and 11b is at the maximum hot position, an air outlet mode switch for detecting whether the air outlet mode is in the foot mode or foot/def mode, and an inside/outside air mode switch for detecting whether the inside/outside air mode is in the outside air introduction mode.

In this embodiment, by processing the signals from these switches in an analog circuit, the same determinations as those performed in the steps 1100 to 1300 of FIG. 7 in the above-mentioned first embodiment are performed.

As described above, in this embodiment, it is possible to perform the same control as that in the first embodiment without the ECU 33.

Next, an eighth embodiment of the present invention will be described.

In this embodiment, further to the construction of the first embodiment, the following control process is added. When a state where each of the air mix doors 11a and 11b is located at the maximum hot position (in the state of heating the passenger compartment rapidly) continues for a while and such a state is released after the interior of the passenger compartment has become warmed up, the air mix doors 11a and 11b are fixed to the maximum hot position until the first suction port opening/closing door 30 has been completely shifted from the solid line position to the chain line position in FIG. 4 and then these air mix doors 11a and 11b are moved in a direction where the bypass passages 9 are opened.

The reason why this embodiment is constructed as the above will be described.

During the determination of "YES" in step 1300 of FIG. 7, the inside/outside air mode is set to the two-layer mode, and further the air mix doors 11 are set at the maximum hot positions. That is, the warm inside air is introduced into the first air passage 13, and all the cool air from the refrigerant evaporator 7c passes through the heater core 8.

When the interior of the passenger compartment is warmed up to some extent and as a result the determination in step 1300 is "NO", if the air mix doors 11 and the first suction port opening/closing door 30 are simultaneously moved, the cold outside air is introduced into the first air passage 13 instead of the warm inside air, and in addition, the cool air flows through the bypass passage 9, so that the temperature of the air blown out from the foot opening portion 16 rapidly decreases.

As a result, the TAO calculated in the step 130 of FIG. 6 becomes rapidly high and the SW that calculated in the step 160 becomes high. Accordingly, the determination in step 1300 of FIG. 6 becomes "YES" again.

The inside/outside air mode becomes the two-layer mode and the air mix doors 11a and 11b are rotated to the maximum hot positions. As a result, the heating capacity for the passenger compartment becomes larger and therefore the determination in step 1300 becomes "NO" soon. Then, these operations are repeatedly performed, thereby causing the hunting of the air mix doors 11a and 11b.

In this embodiment, in order to prevent the hunting of the air mix doors 11a and 11b, when the determination in step 1300 has changed from "YES" to "NO", both of the first suction port opening/closing door 30 and air mix doors 11a and 11b are not moved simultaneously but only the first suction port opening/closing door 30 is moved at first and then the air mix doors 11a and 11b are moved.

A ninth embodiment of the present invention will be described.

In the eighth embodiment, only the first suction port opening/closing door 30 is moved at first and then the air mix doors 11a and 11b are moved, however, in the ninth embodiment, such an operating order is reversed.

That is, in this embodiment, in order to the hunting of the air mixing doors 11a and 11b, the determination in step 1300 has changed from "YES" to "NO", both of the first suction port opening/closing door 30 and air mix doors 11a and 11b are not moved simultaneously but only the air mix doors 11a and 11b are moved at first and then the first suction port opening/closing door 30 is moved.

In the first embodiment, in step 1300 of FIG. 7 it is determined whether or not the air mix doors 11a and 11b are at the maximum hot positions (SW≧100), however, it may be determined on the condition that the maximum hot position includes a state where a small amount of cool air flows through the bypass passage 9. For example, it may be determined whether or not SW≧90 (%).

Also, further to the construction of each of the above-mentioned embodiments, when the defroster mode has been set by the defroster switch (not illustrated) provided on the operation panel 34, the first suction port opening/closing door 30 may be set at the chain line position of FIG. 4 regardless of whether or not the air mix doors 11 are located at the maximum hot position or maximum cool position. In this way, when the outside air introduction mode has been set, the outside air is always introduced into each of the air passages 13 and 14, and therefore it is possible to improve the frost prevention performance of the front windshield.

Figure 16:
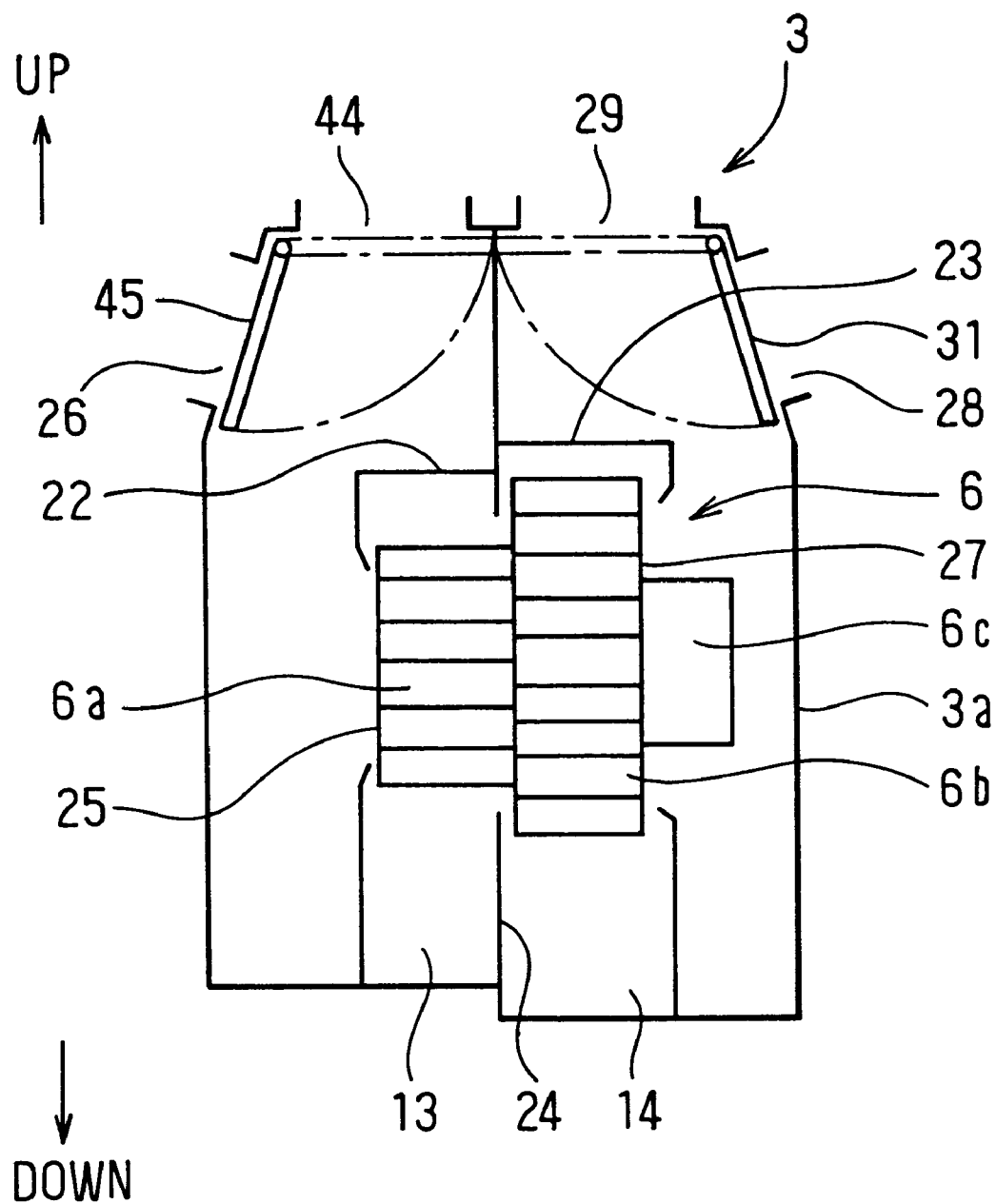
FIG. 16 is a schematic perspective illustration of a modification, viewed from the direction indicated by the arrow B of FIG. 1.

In each of the above-mentioned embodiment, when the outside air is introduced into each of the air passages 13 and 14, the first suction port opening/closing door 30 is set at the chain line position of FIG. 4, and the outside air from the outside air suction port 29 is introduced into each of the air passages 13 and 14, however, as illustrated in FIG. 16, there may be provided a first inside air suction port 26, an outside air suction port 44 and a suction port opening/closing door 45 for selectively opening or closing these suction ports 26 and 44 on the one end side of the first air passage 13. When the outside air is introduced into each of the air passages 13 and 14, the both outside air suction ports 29 and 44 are opened.

In the fifth embodiment, it is determined whether or not the air mix doors 11 are at the maximum hot positions (SW≦0), however, it may be determined on the condition that the maximum hot position includes a state where a small amount of cool air flows through the heater core 8. For example, it may be determined whether or not SW≦10 (%).

In the second embodiment, it is determined whether the front windshield may be frosted by determining whether the temperature difference ΔT between the temperature of the inside air and the temperature of the outside air is lower than the predetermined temperature T0, however, it may be determined by determining whether the engine cooling water temperature is equal to a predetermined temperature (e.g., 35° C.) or less.

In the third embodiment, in the foot mode or foot/def mode, the air mix doors 11a and 11b have the different opening degrees from each other, however, the air mix doors 11a and 11b may have the different opening degrees from each other in the bi-level mode in order to achieve the head cooling and foot heating as a comfortable feeling of warmth to the passenger. The present invention may be also applied to the air conditioner in which the air mix doors 11a and 11b have the different opening degrees from each other in the face mode.

In the third embodiment, the opening degree of the air mix door 11b for adjusting the temperature of the air outside the passenger compartment is corrected in accordance with the decrease in the temperature of the air outside the passenger compartment, however, the opening degree of the air mix door 11a may be corrected in such a manner that the temperature of the conditioned air adjusted by the air mix door 11a decreases in order to reduce the upper/lower temperature difference. Further, only the opening degree of the air mix door 11a may be corrected.

In the third embodiment, the inside/outside air mode is set to the two-layer mode when the air outlet mode is in the foot mode or the foot/def mode, however, the two-layer mode may be set, when the target air temperature TAO is equal to a predetermined value or more.

In the second embodiment, the air mix doors 11a and 11b are rotated integrally, the present invention may be also applied to the air mix doors 11a and 11b rotated independently from each other as in the third embodiment.

In each of the above-mentioned embodiments, the heating heat exchanger is constructed by the heater core 8 using the engine cooling water as the heat source, however, the heating heat exchanger may be constructed by an electric heater generating heat by supplying an electric current thereto, a condenser having a heat pump type refrigeration cycle, or the like.

In each of the above-mentioned embodiments, the present invention is applied to an air-mix type air conditioner for a vehicle, in which the temperature of conditioned air is controlled by adjusting the opening degrees of the air mix doors 11a and 11b, however, the present invention may be applied to a re-heat type air conditioner for a vehicle, in which the temperature of conditioned air is controlled by adjusting the amount of the hot water supplied to the heater core 8 or the temperature of the hot water.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. An air conditioner for a vehicle having a passenger compartment, comprising:

an air conditioning case in which a first inside air suction port and an outside air suction port are formed on one end side and a foot opening portion for blowing out an air toward feet of a passenger within said passenger compartment and a defroster opening portion for blowing out the air toward an inner surface of a windshield of said vehicle are formed on the other end side thereof;

a partitioning member for partitioning an interior of said air conditioning case into a first air passage extending from said first inside air suction port to said foot opening portion and a second air passage extending from said outside air suction port to said defroster opening portion;

an air blower for generating air flow in said first and second air passages in a direction from the one end side to the other end side of said air conditioning case;

a heating heat exchanger provided in said first and said second air passages, for heating the air in said first and second air passages;

first heating amount adjusting means for adjusting a heating amount of the air in said first air passage by said heating heat exchanger;

second heating amount adjusting means for adjusting a heating amount of the air in said second air passage by said heating heat exchanger, said heating amount by said second heating amount adjusting means being controlled to be equal to said heating amount by said first heating amount adjusting means; and maximum heating state detecting means for detecting that both of said first heating amount adjusting means and said second heating amount adjusting means are in the maximum heating states where each heating amount is substantially maximized; wherein, when said maximum heating state detecting means has detected said maximum heating state, the inside air from said first inside air suction port is introduced into said first air passage and the outside air from said outside air suction port is introduced into said second air passage, and when said maximum heating state detecting means has not yet detected the maximum heating state, the outside air from said outside air suction port is introduced into said first and second air passages.

2. An air conditioner as set forth in claim 1, wherein, said air conditioning case includes therein a first bypass passage formed in said first air passage, for bypassing said heating heat exchanger, and a second air passage formed in said second air passage, for bypassing said heating heat exchanger, said first heating amount adjusting means is disposed in said first air passage and includes first air amount ratio adjusting means for adjusting an air amount ratio between an amount of air passing through said heating heat exchanger and an amount of air passing through said first bypass passage, said second heating amount adjusting means is disposed in said second air passage and includes second air amount ratio adjusting means for adjusting an air amount ratio between an amount of air passing through said heating heat exchanger and an amount of air passing through said second bypass passage.

3. An air conditioner as set forth in claim 1, further comprising:

frost condition detecting means for detecting a condition that said windshield may be frosted, wherein, when said frost conditions detecting means has detected said condition, the outside air from said outside air suction port is introduced into said first and second air passages.

4. An air conditioner as set forth in claim 1, wherein, said air conditioning case includes therein on the one end side a communication passage for communicating between said first air passage and said second air passage, when the inside air from said first inside air suction port is introduced into said first air passage and said outside air from said outside air suction port is introduced into said second air passage, said communication passage is closed; and when the outside air from said outside air suction port is introduced into said first and second air passages, the communication passage is opened to introduce the outside air into said first air passage through said communication passage.

5. An air conditioner for a vehicle having a passenger compartment, comprising:

an air conditioning case having a foot opening portion for blowing out an air toward feet of a passenger in the passenger compartment, and having a defroster opening portion for blowing out the air toward an inner surface of a windshield of the vehicle;

an inlet port switching means having an inside air inlet port and an outside air inlet port for opening and closing said inside air inlet port and said outside air inlet port, said inside air inlet port for introducing an inside air to said air conditioning case, said outside air inlet port for introducing an outside air to said air conditioning case;

a heating heat exchanger for heating an air in said air conditioning case; and air-temperature adjusting means for adjusting a heating amount of said heating heat exchanger, wherein:

an air passage within said air conditioning case is partitioned to form a first air passage to induct inside air introduced by operating said inlet port switching means to said foot opening portion, and a second air passage to induct outside air introduced by operating said inlet port switching means to said defroster opening portion when said foot opening portion and said defroster opening portion are both simultaneously opened when said air-temperature adjusting means is operated at a location where said heating amount is maximized and a maximum heating state is established;

the air conditioner includes maximum heating state detecting means for detecting that said air-temperature adjusting means is in said maximum heating state; and said inside air is introduced to said foot opening portion via said first air passage, and said outside air is introduced to said defroster opening portion via said second air passage, when said heating state detecting means detects said maximum heating state of said air-temperature adjusting means.

6. An air conditioner for a vehicle having a passenger compartment, comprising:

an air conditioning case having a foot opening portion for blowing out an air toward feet of a passenger in the passenger compartment, and having a defroster opening portion for blowing out the air toward an inner surface of a windshield of the vehicle;

an inlet port switching means having an inside air inlet port and an outside air inlet port for opening and closing said inside air inlet port and said outside air inlet port, said inside air inlet port for introducing an inside air to said air conditioning case, said outside air inlet port for introducing an outside air to said air conditioning case;

a heating heat exchanger for heating an air in said air conditioning case; and air-temperature adjusting means for adjusting a heating amount of said heating heat exchanger, wherein:

an air passage within said air conditioning case is partitioned to form a first air passage to induct inside air introduced by operating said inlet port switching means to said foot opening portion, and a second air passage to induct outside air introduced by operating said inlet port switching means to said defroster opening portion when said foot opening portion and said defroster opening portion are both simultaneously opened when said air-temperature adjusting means is operated at a location where said heating amount is maximized and a maximium heating state is established;

the air conditioner includes maximum heating state detecting means for detecting that said air-temperature adjusting means is in said maximum heating state;

said inside air is introduced to said foot opening portion via said first air passage, and said outside air is introduced to said defroster opening portion via said second air passage, when said heating state detecting means detects said maximum heating state of said air-temperature adjusting means; and said outside air is introduced to said foot opening portion and said defroster opening portion when said maximum heating state detecting means has not yet detected said maximum heating state of said air-temperature adjusting means.

* * * * *